United States Patent
Yao et al.

(10) Patent No.: US 11,290,924 B2
(45) Date of Patent: Mar. 29, 2022

(54) COMMUNICATION METHOD AND COMMUNICATIONS DEVICE FOR IMPROVED HANDOVER WITH CHANGED COMMON SYSTEM INFORMATION

(71) Applicant: HUAWEI TECHNOLOGIES CO., LTD., Guangdong (CN)

(72) Inventors: Chuting Yao, Beijing (CN); Haibo Xu, Beijing (CN); Jian Wang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/648,509

(22) PCT Filed: May 16, 2018

(86) PCT No.: PCT/CN2018/087186
§ 371 (c)(1),
(2) Date: Mar. 18, 2020

(87) PCT Pub. No.: WO2019/062152
PCT Pub. Date: Apr. 4, 2019

(65) Prior Publication Data
US 2020/0229043 A1    Jul. 16, 2020

(30) Foreign Application Priority Data

Sep. 30, 2017 (CN) .......................... 201710916174.6

(51) Int. Cl.
*H04W 36/00* (2009.01)
*H04W 36/08* (2009.01)
*H04W 68/00* (2009.01)

(52) U.S. Cl.
CPC ... *H04W 36/0016* (2013.01); *H04W 36/0055* (2013.01); *H04W 36/08* (2013.01); *H04W 68/005* (2013.01)

(58) Field of Classification Search
CPC ......... H04W 36/0016; H04W 36/0055; H04W 36/08; H04W 68/005; H04W 36/00837; H04W 36/36; H04W 36/0077
(Continued)

(56) References Cited

U.S. PATENT DOCUMENTS

2008/0137596 A1    6/2008    Williams et al.
2011/0051660 A1    3/2011    Arora et al.
(Continued)

FOREIGN PATENT DOCUMENTS

CN    101500282 A    8/2009
CN    102065496 A    5/2011
(Continued)

OTHER PUBLICATIONS

XP051355647 R2-1711600 Samsung,"Conditional Handover: Event Design Aspects",3GPP TSG RAN WG2 #99, Prague, Czech Republic, Oct. 9 to 13, 2017. ( 5 pages).
(Continued)

*Primary Examiner* — Michael Y Mapa
(74) *Attorney, Agent, or Firm* — Westerman, Hattori, Daniels & Adrian, LLP

(57) ABSTRACT

A communication method includes: sending, by a first device, a handover request message to a second device, and receiving a handover acknowledgement message returned by the second device, where the handover acknowledgement message carries common system information of the second device; sending, by the first device, a handover command to a terminal, where the handover command includes the common system information of the second device; sending, by the first device, a second message to the terminal based on a first message, so that the terminal obtains changed communications system information of the second device based on the second message, where the first message is sent
(Continued)

by the second device, and the first message is used to indicate a change occurring in the common system information of the second device.

20 Claims, 14 Drawing Sheets

(58) Field of Classification Search
USPC ............................ 455/435.1–445; 370/331
See application file for complete search history.

(56) References Cited

U.S. PATENT DOCUMENTS

| | | | |
|---|---|---|---|
| 2011/0268085 A1* | 11/2011 | Barany | H04W 36/0033 |
| | | | 370/331 |
| 2011/0269500 A1 | 11/2011 | Johansson et al. | |
| 2011/0317665 A1 | 12/2011 | Jung et al. | |
| 2016/0150447 A1* | 5/2016 | Quan | H04W 36/0058 |
| | | | 370/331 |
| 2016/0366633 A1* | 12/2016 | Luo | H04W 40/04 |
| 2017/0135001 A1* | 5/2017 | Kim | H04W 36/0077 |
| 2017/0142630 A1 | 5/2017 | Yi et al. | |
| 2019/0297542 A1* | 9/2019 | Tang | H04W 76/19 |

FOREIGN PATENT DOCUMENTS

| | | |
|---|---|---|
| CN | 102405666 A | 4/2012 |
| CN | 102474776 A | 5/2012 |
| CN | 102484835 A | 5/2012 |

OTHER PUBLICATIONS

XP051055534 R2-161753 Ericsson ,"Providing SI parameters in connected mode",3GPP TSG-RAN WG2 #93,St. Julian s, Malta, Feb. 15-19, 2016. (3 pages).

Extended (Supplementary) European Search Report dated Sep. 16, 2020 issued in counterpart EP application No. 18863302.8. (13 pages).

3GPP TS 36.331 V14.3.0 (Jun. 2017), 3rd Generation Partnership Project; Technical Specification Group Radio Access Network; Evolved Universal Terrestrial Radio Access (E-UTRA); Radio Resource Control (RRC); Protocol specification (Release 14), 745 pages.

International Search Report dated Aug. 6, 2018, issued in counterpart application No. PCT/CN2018/087186, with English Translation. (11 pages).

R2-1710977 ASTRI, TCL Communication Ltd.,"Discussion on Conditional Handover in NR",3GPP TSG-RAN WG2 Meeting #99bis,Prague, Czech Republic, Oct. 9-13, 2017 ,total 6 pages.

Office Action dated Aug. 31, 2020, issued in counterpart CN Application No. 201710916174.6, with English Abstract. (27 pages).

* cited by examiner

COMMUNICATION METHOD AND COMMUNICATIONS DEVICE FOR IMPROVED HANDOVER WITH CHANGED COMMON SYSTEM INFORMATION

CROSS-REFERENCE TO RELATED APPLICATIONS

This application is a national stage of International Application No. PCT/CN2018/087186, filed on May 16, 2018, which is hereby incorporated by reference in its entirety.

TECHNICAL FIELD

Embodiments of this application relate to communications technologies, and in particular, to a communication method and a communications device.

BACKGROUND

A handover in mobile communication is a process in which when a terminal transmits information to a base station, due to various reasons such as relatively poor quality of channel transmission and service balancing, the terminal needs to shift from an originally used channel to a more appropriate channel for information transmission.

During a handover (Handover, HO) in the 3rd generation partnership project (3rd Generation Partnership Project, 3GPP) standard release 14 (Release-14), a source base station sends, to a terminal by using a radio resource control (Radio Resource Control, RRC) connection reconfiguration message, system information required for accessing a target base station, and the terminal needs to perform reconfiguration and establish a connection to the target base station, based on the RRC connection reconfiguration message sent by the source base station. If a user cannot successfully receive the RRC connection reconfiguration message, the user camps on a source cell and cannot be handed over to another cell in a timely manner, resulting in a radio link failure (Radio Link Failure, RLF) and transmission interruption. To resolve the foregoing problems during the handover in the Release-14, a conditional handover (Conditional HO, CHO) is proposed in a next-generation communications technology (5th generation communications technology, 5G). Specifically, a source base station makes an early handover decision based on an early measurement report provided by a terminal, and sends a CHO request to one or more candidate base stations; and each of the one or more candidate base stations performs access control (admission control) based on a current status of the candidate base station, and reserves a resource and sends an acknowledgement (acknowledgement, ACK) message to the source base station after allowing access of the terminal, where the ACK message includes system information required for accessing the candidate base station. The terminal receives, when a channel condition is good, a CHO command (CHO command) delivered by the source base station by using an RRC connection reconfiguration message, and a condition for applying the CHO command, where the CHO command includes the system information required for accessing the candidate base station. The terminal detects whether the condition is met, and after the condition is met, the terminal is handed over to a candidate base station that meets the condition. After the terminal successfully accesses the candidate base station that meets the condition, the candidate base station notifies the source base station that the terminal has been handed over to the candidate base station, and the source base station releases a resource reserved by another candidate base station.

However, during the CHO, because the CHO command only can be triggered based on a condition, there is a case in which the condition for applying the CHO command is not met for a quite long time, and the system information, used for accessing the candidate base station, in common system information (common SI) of the candidate base station in this period of time changes. When this case occurs, even if the condition for applying the CHO command is met later, an access failure also occurs when the terminal is being handed over to the candidate base station by applying the CHO command.

SUMMARY

Embodiments of this application provide a communication method and a communications device, to increase a handover success rate.

According to a first aspect, an embodiment of this application provides a communication method, including: sending, by a first device, a handover request message to a second device, and receiving a handover acknowledgement message returned by the second device, where the handover acknowledgement message carries common system information of the second device; sending, by the first device, a handover command to a terminal, where the handover command includes the common system information of the second device; and sending, by the first device, a second message to the terminal based on a first message, so that the terminal obtains changed communications system information of the second device based on the second message, where the first message is sent by the second device, and the first message is used to indicate a change occurring in the common system information of the second device.

With reference to the first aspect, in a possible implementation of the first aspect, the first message includes the changed common system information of the second device, or the changed common system information of the second device and an application condition of the changed common system information.

With reference to the first aspect or the possible implementation of the first aspect, in another possible implementation of the first aspect, the first message includes first change indication information of the second device, or second change indication information of the second device and an application condition of the second change indication information, where the first change indication information is used to indicate that the common system information of the second device has changed, and the second change indication information is used to indicate that the common system information of the second device changes when the application condition is met.

With reference to any one of the first aspect or the possible implementations of the first aspect, in another possible implementation of the first aspect, the second message includes the changed common system information of the second device, or the changed common system information of the second device and the application condition of the changed common system information.

With reference to any one of the first aspect or the possible implementations of the first aspect, in another possible implementation of the first aspect, the second message includes the first change indication information of the second device, or the second change indication information of the second device and the application condition of the second change indication information, where the first change indication information is used to indicate that the common system information of the second device has changed, and the second change indication information is used to indicate that the common system information of the second device changes when the application condition is met.

With reference to any one of the first aspect or the possible implementations of the first aspect, in another possible implementation of the first aspect, the application condition of the changed common system information or the application condition of the second change indication information includes the following: A timer expires, or a system time reaches a first system time, or a system frame number reaches a first system frame number. The system time is a system time of either the first device or the second device, and the system frame number is a system frame number of either the first device or the second device.

With reference to any one of the first aspect or the possible implementations of the first aspect, in another possible implementation of the first aspect, the sending, by the first device, a second message to the terminal based on a first message includes: receiving, by the first device, the first message sent by the second device; determining, by the first device, the second message based on the first message; and sending, by the first device, a paging message to the terminal, where the paging message carries the second message.

According to a second aspect, an embodiment of this application provides a communication method, including: receiving, by a terminal, a handover command sent by a first device, where the handover command includes common system information of a second device; receiving, by the terminal, a second message sent by the first device, where the second message is used to indicate a change occurring in the common system information of the second device; and obtaining, by the terminal, changed common system information of the second device based on the second message. When the terminal is handed over to the second device, the terminal uses the changed common system information for the handover to the second device.

With reference to the second aspect, in a possible implementation of the second aspect, the second message includes the changed common system information of the second device; and the obtaining, by the terminal, changed common system information of the second device based on the second message includes: updating, by the terminal, the common system information of the second device based on the changed common system information of the second device.

With reference to the second aspect or the possible implementation of the second aspect, in another possible implementation of the second aspect, the second message includes the changed common system information and an application condition of the changed common system information; and the obtaining, by the terminal, changed common system information of the second device based on the second message includes: updating, by the terminal after the application condition is met, the common system information of the second device based on the changed common system information of the second device.

With reference to the second aspect or the possible implementation of the second aspect, in another possible implementation of the second aspect, the second message includes first change indication information of the second device; and the obtaining, by the terminal, changed common system information of the second device based on the second message includes: obtaining, by the terminal, the changed common system information of the second device based on the first change indication information of the second device.

With reference to the second aspect or the possible implementation of the second aspect, in another possible implementation of the second aspect, the second message includes second change indication information of the second device and an application condition of the second change indication information; and the obtaining, by the terminal, changed common system information of the second device based on the second message includes: obtaining, by the terminal after the application condition is met, the changed common system information of the second device based on the second change indication information of the second device.

With reference to any one of the second aspect or the possible implementations of the second aspect, in another possible implementation of the second aspect, the receiving, by the terminal, a second message sent by the first device includes: receiving, by the terminal, a paging message sent by the first device, where the paging message carries the second message.

With reference to the second aspect or the possible implementation of the second aspect, in another possible implementation of the second aspect, the paging message further carries a cell identity; and the obtaining, by the terminal, the changed common system information of the second device based on the first change indication information of the second device includes: obtaining, by the terminal based on the first change indication information and the cell identity, changed common system information of a second device corresponding to the cell identity.

With reference to any one of the second aspect or the possible implementations of the second aspect, in another possible implementation of the second aspect, the paging message further includes a cell identity; and the obtaining, by the terminal, the changed common system information of the second device based on the second change indication information of the second device includes:

obtaining, by the terminal after the application condition is met, changed common system information of a second device corresponding to the cell identity, based on the second change indication information of the second device and the cell identity.

According to a third aspect, an embodiment of this application provides a communication method, including: receiving, by a second device, a handover request message sent by a first device, and returning a handover acknowledgement message to the first device, where the handover acknowledgement message carries common system information of the second device; and sending, by the second device, a first message to the first device, where the first message is used to indicate a change occurring in the common system information of the second device.

With reference to the third aspect, in a possible implementation of the third aspect, the sending, by the second device, a first message to the first device includes: sending, by the second device, the first message to the first device after the common system information of the second device changes, where the first message is used to indicate that the common system information of the second device has changed; or sending, by the second device, the first message to the first device in a time period before the common system information of the second device changes, where the first message is used to indicate that the common system information of the second device is about to change.

According to a fourth aspect, an embodiment of this application provides a communication method, including: sending, by a second device, a first message to a first device in a time period before common system information of the second device changes, where the first message is used to indicate an application condition of changed common system information and that the common system information of the second device changes.

According to a fifth aspect, an embodiment of this application provides a communication method, including: sending, by a first device, a handover request message to a second device, and receiving a handover acknowledgement message returned by the second device, where the handover acknowledgement message carries common system information of the second device and paging configuration information or a system information tag value of the second device, where the paging configuration information or the system information tag value of the second device is used to: determine whether or when the common system information of the second device changes, and obtain changed common system information of the second device after the common system information of the second device changes.

According to a sixth aspect, an embodiment of this application provides a communication method, including: receiving, by a terminal, a handover command sent by a first device, where the handover signaling carries common system information of a second device and paging configuration information or a system information tag value of the second device; and obtaining, by the terminal, changed common system information based on the paging configuration information or the system information tag value of the second device.

With reference to the sixth aspect, in a possible implementation of the sixth aspect, the obtaining, by the terminal, changed common system information based on the paging configuration information of the second device includes: periodically reading, by the terminal, a paging message of the second device based on the paging configuration information of the second device; and when the paging message carries system information modification indication information, obtaining, by the terminal, the changed common system information of the second device in a period following a period in which the paging message is read.

With reference to the sixth aspect or the possible implementation of the sixth aspect, in another possible implementation of the sixth aspect, the obtaining, by the terminal, changed common system information based on the system information tag value of the second device includes: periodically reading, by the terminal, a system information block SIB1 of the second device; and when a system information tag value of the SIB1 read in an $N^{th}$ period is different from a system information tag value read in a previous period, obtaining, by the terminal, common system information of the second device in the $N^{th}$ period, that is, the changed common system information of the second device, where N is an integer greater than or equal to 1, and when N=1, the system tag value read in the previous period is the system information tag value of the second device that is carried in the handover command.

The system information tag value is a parameter in the system information block SIB1.

According to a seventh aspect, an embodiment of this application provides a communication method, including: receiving, by a terminal, a handover command sent by a first device; periodically reading, by the terminal, a system information tag value of a system information block SIB1 of the second device based on the handover command; and obtaining, by the terminal, changed common system information of the second device when the system information tag value changes.

With reference to any one of the first aspect to the seventh aspect, or the possible implementations of the first aspect to the seventh aspect, the handover command is an immediate handover command or a conditional handover command.

According to an eighth aspect, an embodiment of this application provides a communications device, serving as a first device. The communications device has a function of implementing actions of the first device in the foregoing method implementations. The function may be implemented by hardware, or may be implemented by hardware by executing corresponding software. The hardware or the software includes one or more modules corresponding to the foregoing function.

According to a ninth aspect, an embodiment of this application provides a communications device, serving as a first device. The communications device includes a processor, a memory, a transmitter, and a receiver. Both the transmitter and the receiver are coupled to the processor, the processor controls a sending action of the transmitter, and the processor controls a receiving action of the receiver. The memory is configured to store computer executable program code, and the program code includes an instruction. When the processor executes the instruction, the instruction enables the communications device to perform the communication method according to any one of the first aspect or the possible implementations of the first aspect, or the communication method according to the fifth aspect.

According to a tenth aspect, an embodiment of this application provides a computer-readable storage medium, configured to store a computer software instruction used by the foregoing first device. When the computer software instruction is run on a computer, the computer is enabled to perform the communication method according to any one of the first aspect or the possible implementations of the first aspect, or the communication method according to the fifth aspect.

According to an eleventh aspect, an embodiment of this application provides a computer program product including an instruction. When the instruction is run on a computer, the computer is enabled to perform the communication method according to any one of the first aspect or the possible implementations of the first aspect, or the communication method according to the fifth aspect.

According to a twelfth aspect, an embodiment of this application provides a terminal. The terminal has a function of implementing actions of the terminal in the foregoing methods. The function may be implemented by hardware, or may be implemented by hardware by executing corresponding software. The hardware or the software includes one or more modules corresponding to the foregoing function.

According to a thirteenth aspect, an embodiment of this application provides a terminal, including a processor, a memory, a transmitter, and a receiver. Both the transmitter and the receiver are coupled to the processor, the processor controls a sending action of the transmitter, and the processor controls a receiving action of the receiver. The memory is configured to store computer executable program code, the program code includes an instruction, and when the processor executes the instruction, the instruction enables the terminal to perform the communication method according to any one of the second aspect or the possible implementations of the second aspect, any one of the sixth aspect or the possible implementations of the sixth aspect, or the communication method according to the seventh aspect.

According to a fourteenth aspect, an embodiment of this application provides a computer-readable storage medium, configured to store a computer software instruction used by the foregoing terminal. When the computer software instruction is run on a computer, the computer is enabled to perform the communication method according to any one of the second aspect or the possible implementations of the second aspect, any one of the sixth aspect or the possible implementations of the sixth aspect, or the communication method according to the seventh aspect.

According to a fifteenth aspect, an embodiment of this application provides a computer program product including an instruction. When the instruction is run on a computer, the computer is enabled to perform the communication method according to any one of the second aspect or the possible implementations of the second aspect, any one of the sixth aspect or the possible implementations of the sixth aspect, or the communication method according to the seventh aspect.

According to a sixteenth aspect, an embodiment of this application provides a communications device, acting as a second device. The second device has a function of implementing actions of the second device in the foregoing methods. The function may be implemented by hardware, or may be implemented by hardware by executing corresponding software. The hardware or the software includes one or more modules corresponding to the foregoing function.

According to a seventeenth aspect, an embodiment of this application provides a communications device, acting as a second device. The communications device includes a processor, a memory, a transmitter, and a receiver. Both the transmitter and the receiver are coupled to the processor, the processor controls a sending action of the transmitter, and the processor controls a receiving action of the receiver. The memory is configured to store computer executable program code, and the program code includes an instruction. When the processor executes the instruction, the instruction enables the communications device to perform the communication method according to any one of the third aspect or the possible implementations of the third aspect, or the communication method according to the fourth aspect.

According to an eighteenth aspect, an embodiment of this application provides a computer-readable storage medium, configured to store a computer software instruction used by the foregoing second device. When the computer software instruction is run on a computer, the computer is enabled to perform the communication method according to any one of the third aspect or the possible implementations of the third aspect, or the communication method according to the fourth aspect.

According to a nineteenth aspect, an embodiment of this application provides a computer program product including an instruction. When the instruction is run on a computer, the computer is enabled to perform the communication method according to any one of the third aspect or the possible implementations of the fourth aspect, or the communication method according to the fourth aspect.

According to a twentieth aspect, an embodiment of this application provides a chip, including a memory and a processor. The memory is configured to store a program instruction, and the processor is configured to invoke the program instruction stored in the memory, to implement the communication method according to any one of the first aspect or the possible implementations of the first aspect.

According to a twenty-first aspect, an embodiment of this application provides a chip, including a memory and a processor. The memory is configured to store a program instruction, and the processor is configured to invoke the program instruction stored in the memory, to implement the communication method according to any one of the second aspect or the possible implementations of the second aspect.

According to a twenty-second aspect, an embodiment of this application provides a chip, including a memory and a processor. The memory is configured to store a program instruction, and the processor is configured to invoke the program instruction stored in the memory, to implement the communication method according to any one of the third aspect or the possible implementations of the third aspect.

According to a twenty-third aspect, an embodiment of this application provides a chip, including a memory and a processor. The memory is configured to store a program instruction, and the processor is configured to invoke the program instruction stored in the memory, to implement the communication method according to the fourth aspect.

According to a twenty-fourth aspect, an embodiment of this application provides a chip, including a memory and a processor. The memory is configured to store a program instruction, and the processor is configured to invoke the program instruction stored in the memory, to implement the communication method according to the fifth aspect.

According to a twenty-fifth aspect, an embodiment of this application provides a chip, including a memory and a processor. The memory is configured to store a program instruction, and the processor is configured to invoke the program instruction stored in the memory, to implement the communication method according to any one of the sixth aspect or the possible implementations of the sixth aspect.

According to a twenty-sixth aspect, an embodiment of this application provides a chip, including a memory and a processor. The memory is configured to store a program instruction, and the processor is configured to invoke the program instruction stored in the memory, to implement the communication method according to the seventh aspect or the possible implementation of the seventh aspect.

According to the communication method and the communications device in the embodiments of this application, after sending the handover command to the terminal, the first device receives, by using the first device, the first message sent by the second device, where the first message is used to indicate that the common system information of the second device changes; the first device sends the second message to the terminal, so that the terminal obtains the changed communications system information of the second device based on the second message; and when the terminal is handed over to the second device, the terminal uses the changed common system information for the handover to the second device. In this way, after the common system information of the second device changes, the terminal can obtain the changed common system information of the second device in a timely manner, so that when the terminal is handed over to the second device, the terminal uses the changed common system information for the handover to the second device. This avoids a handover failure and increases a handover success rate.

BRIEF DESCRIPTION OF DRAWINGS

The following briefly describes the accompanying drawings required for describing embodiments or the prior art.

DESCRIPTION OF EMBODIMENTS

Figure 1:
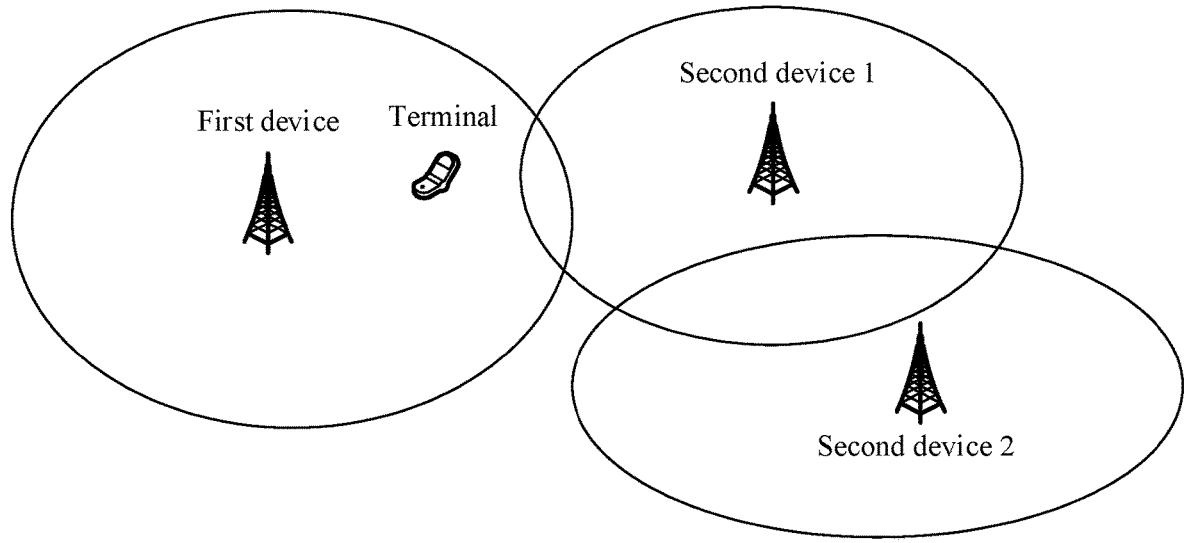
FIG. 1 is a schematic diagram of an application scenario according to this application.

The following clearly and completely describes the technical solutions in the embodiments of this application with reference to the accompanying drawings in the embodiments of this application.

First, some terms in this application are explained.

A "first device" in this application is specifically a serving base station that establishes a communication connection to a terminal in a mobility management process. The serving base station may make a handover decision for the terminal based on a measurement report provided by the terminal. The serving base station may also be referred to as a source base station.

A "second device" in this application is specifically a candidate base station that can provide a communication connection for the terminal in the mobility management process. The terminal may be handed over from the first device to the candidate base station.

It may be understood that, the base station may be a base station NodeB, an evolved based station eNodeB, a base station in a 5G communications system, a base station in a future communications system, an access node in a Wi-Fi system, or the like. Specific technologies and specific device forms used by the first device and the second device are not limited in the embodiments of this application.

The terminal in this application is a device (device) that provides voice and/or data connectivity for a user, and includes a wireless terminal or a wired terminal. The wireless terminal may be a handheld device with a wireless connection function, another processing device connected to a wireless modem, or a mobile terminal that communicates with one or more core networks over a radio access network. For example, the wireless terminal may be a mobile phone (also referred to as a "cellular" phone) and a computer with a mobile terminal. For another example, the wireless terminal may alternatively be a portable, pocket-sized, handheld, computer built-in, or in-vehicle mobile apparatus. For another example, the wireless terminal may be a part of a mobile station (English: Mobile Station), an access point (English: Access Point), or user equipment (English: User Equipment, UE for short).

"Common system information" in this application is specifically related configuration information required by the terminal to access the candidate base station, for example, configuration information of a physical random access channel (PRACH), uplink power control information, and other configuration information. The common system information is different from dedicated system information. The dedicated system information is specifically specific information provided by the candidate base station for the terminal, for example, time-frequency resource information for random access.

The term "and/or" in this application describes an association relationship between associated objects and represents that three relationships may exist. For example, A and/or B may represent the following three cases: Only A exists, only B exists, and both A and B exist.

The terms "first", "second", and the like in this application are intended to distinguish between different objects but do not indicate a particular order.

FIG. 1 is a schematic diagram of an application scenario according to this application. As shown in FIG. 1, one first device, two second devices, and one terminal are used as an example for description in the application scenario. The two second devices include a second device 1 and a second device 2, the terminal is located in a cell of the first device and establishes a wireless communication connection to the first device, and the first device serves as a source base station of the terminal. The first device makes an early handover decision based on a measurement report provided by the terminal, and sends a handover request to both the second device 1 and the second device 2. After allowing access of the terminal, the second device 1 and the second device 2 separately reserve a resource for the terminal, and separately send an acknowledgement message to the first device, where the acknowledgement message sent by the second device 1 includes common system information of the second device 1, and the acknowledgement message of the second device 2 includes common system information of the second device 2; and the first device sends one handover command or two handover commands to the terminal, where the handover command includes the common system information of both the second device 1 and the second device 2, or one of the two handover commands includes the common system information of the second device 1, and the other handover command includes the common system information of the second device 2. When the communications system information of the second device 1 and/or the second device 2 changes, the terminal can obtain changed common system information in a timely manner by using a communication method in this application; and when the terminal is handed over to the second device 1 or the second device 2, for example, when a handover condition of the second device 1 or the second device 2 is met, the terminal uses the changed common system information for accessing the second device 1 or the second device 2. This avoids a handover failure and ensures communication continuity of the terminal. For a specific implementation of the communication method in this application, refer to specific descriptions of the following embodiments.

Figure 2:
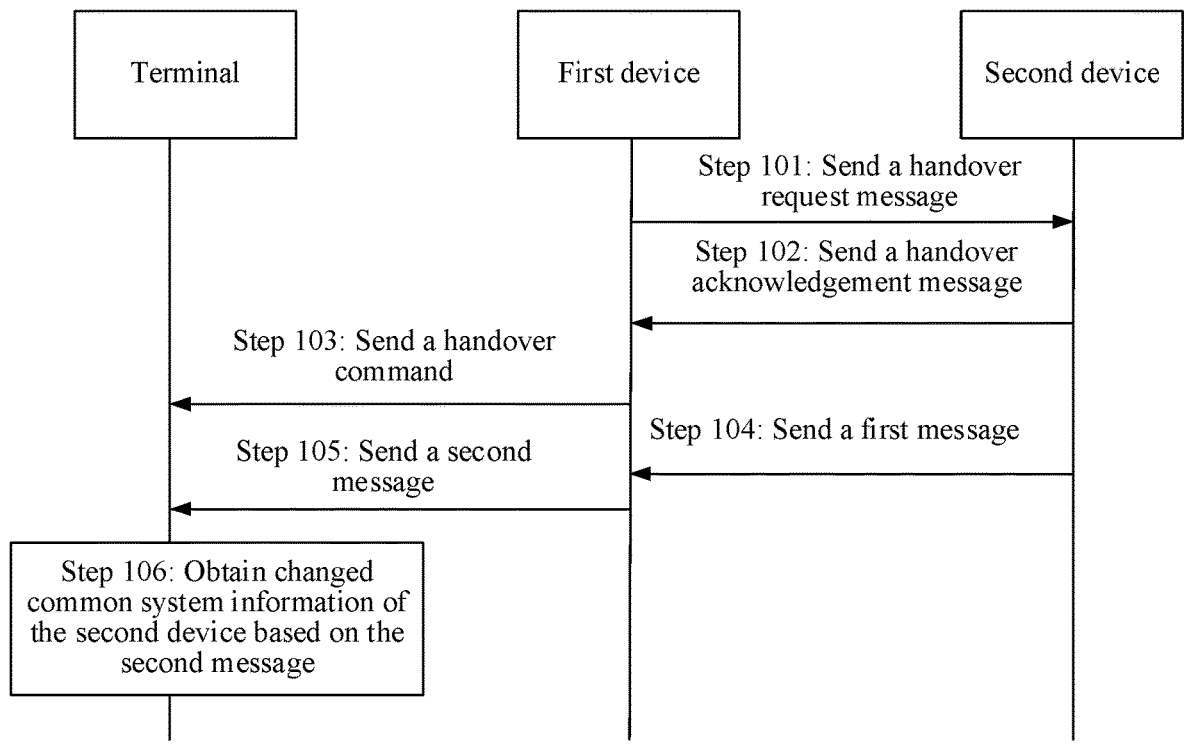
FIG. 2 is a flowchart of a communication method according to this application.

FIG. 2 is a flowchart of a communication method according to this application. As shown in FIG. 2, the method in this embodiment may include the following steps:

Step 101: A first device sends a handover request message to a second device, and the second device receives the handover request message sent by the first device.

Step 102: The second device sends a handover acknowledgement message to the first device, and the first device receives the handover acknowledgement message sent by the second device.

The handover acknowledgement message carries common system information of the second device.

Step 103: The first device sends a handover command to a terminal.

The terminal receives the handover command sent by the first device. The handover command may include the common system information of the second device. Certainly, it may be understood that, the handover command may further include common system information of another second device. In other words, the handover command may include common system information of one or more second devices.

The handover command may be an immediate handover command, or may be a conditional handover command (CHO Command).

In an possible implementation, the first device determines a target base station based on a measurement report provided by the terminal, and sends a handover request message to the target base station. After allowing access of the terminal, the target base station sends a handover acknowledgement message to the first device, where the handover acknowledgement message carries common system information of the target base station, and the target base station is the second device in this instance of this application; and the first device sends, to the terminal, an immediate handover command that carries the common system information of the second device.

In another possible implementation, the first device may make a handover decision based on a measurement report provided by the terminal, and send a handover request message to one or more candidate base stations; each of the one or more candidate base stations performs access control based on a current status of the candidate base station, to determine whether to allow access of the terminal; a candidate base station that allows access of the terminal reserves a resource for the terminal, and sends a handover acknowledgement message to the first device, where the handover acknowledgement message carries common system information of the candidate base station, and the candidate base station that allows access of the terminal is the second device in this embodiment of this application; and the first device sends, to the terminal, a conditional handover command that carries common system information of the one or more second devices.

Step 104: The second device sends a first message to the first device, and the first device receives the first message sent by the second device, where the first message is used to indicate a change occurring in the common system information of the second device.

The second device sends the first message to the first device. Specifically, if the common system information of the second device changes, or if the common system information of the second device is about to change, the second device sends the first message to the first device, to indicate that the common system information of the second device changes or is about to change. In other words, changed common system information of the second device is different from the common system information of the second device that is in the handover command in step 103.

It should be noted that, this embodiment is described by using an example in which common system information of one second device changes. When common system information of any second device that is in the handover command changes or is about to change, the second device may perform step 104, and correspondingly, the first device and the terminal perform the following step 105 and step 106.

Step 105: The first device sends a second message to the terminal based on the first message, where the second message is used to indicate the change occurring in the common system information of the second device.

The change includes as follows: The common system information has changed and the common system information is about to change.

The terminal receives the second message sent by the first device. In an possible implementation, the second message specifically includes the changed common system information of the second device, to indicate that the common system information of the second device has changed. In another possible implementation, the second message specifically includes the changed common system information of the second device and an application condition of the changed common system information, to indicate that the common system information of the second device is about to change. In still another possible implementation, the second message includes first change indication information of the second device, to indicate that the common system information of the second device has changed. In yet another possible implementation, the second message includes second change indication information of the second device and an application condition of the second change indication information, to indicate that the common system information of the second device is about to change. Specifically, the second change indication information is used to indicate that the common system information of the second device changes when the application condition is met.

Step 106: The terminal obtains the changed common system information of the second device based on the second message.

When the terminal is handed over to the second device, the terminal uses the changed common system information for the handover to the second device.

In an possible implementation, the second message includes the changed common system information of the second device, and the terminal may update the common system information of the second device based on the changed common system information of the second device. When the terminal is handed over to the second device, the terminal uses the changed common system information for the handover to the second device.

In another possible implementation, the second message includes the changed common system information and the application condition of the changed common system information, and after the application condition is met, the terminal updates the common system information of the second device based on the changed common system information of the second device. When the terminal is handed over to the second device, the terminal uses the changed common system information for the handover to the second device.

In still another possible implementation, the second message includes the first change indication information of the second device, and the terminal obtains the changed common system information of the second device based on the first change indication information of the second device. When the terminal is handed over to the second device, the terminal uses the changed common system information for the handover to the second device.

In yet another possible implementation, the second message includes the second change indication information of the second device and the application condition of the second change indication information, and after the application condition is met, the terminal obtains the changed common system information of the second device based on the second change indication information of the second device. When the terminal is handed over to the second device, the terminal uses the changed common system information for the handover to the second device.

Optionally, the first message may include the changed common system information of the second device, or the changed common system information of the second device and the application condition of the changed common system information, or the first change indication information of the second device, or the second change indication information of the second device and the application condition of the second change indication information. The first change indication information of the second device is used to indicate that the common system information of the second device has changed, and the second change indication information is used to indicate that the common system information of the second device changes when the application condition is met.

Optionally, the application condition of the changed common system information or the application condition of the second change indication information may specifically include the following: A timer expires, or a system time reaches a first system time, or a system frame number (System Frame Number, SFN) reaches a first system frame number. The system time is a system time of either the first device or the second device, and the system frame number is a system frame number of either the first device or the second device.

Specifically, duration of the timer, the first system time, or the first system frame number may be set flexibly as required.

In the foregoing embodiment, the first message and the second message may be new messages, or may be existing messages. For example, the second message may specifically be carried in a paging message or an RRC connection reconfiguration message.

Optionally, an possible implementation of step 105 is as follows: The first device determines the second message based on the first message, and the first device sends the paging message to the terminal, where the paging message carries the second message.

It should be noted that, a sequence of step 104 and step 103 is not limited by a sequence number. To be specific, step 104 may be performed before step 103 or after step 103, or step 104 and step 103 may be performed at the same time. This may be set flexibly as required.

In this embodiment, after sending the handover command to the terminal, the first device receives, by using the first device, the first message sent by the second device, where the first message is used to indicate that the common system information of the second device changes; the first device sends the second message to the terminal, so that the terminal obtains the changed communications system information of the second device based on the second message, and when the terminal is handed over to the second device, the terminal uses the changed common system information for the handover to the second device. In this way, after the common system information of the second device changes, the terminal can obtain the changed common system information of the second device in a timely manner, so that when the terminal is handed over to the second device, the terminal uses the changed common system information for the handover to the second device. This avoids a handover failure and increases a handover success rate.

It should be noted that, the "handover command" in FIG. 2 to FIG. 6 in this application may be one handover command, where the handover command includes the common system information of the one or more second devices; or may be a plurality of handover commands, where each handover command includes the common system information of the one or more second devices.

The technical solution in the method embodiment shown in FIG. 2 is described in detail below by using several specific embodiments.

Figure 3:
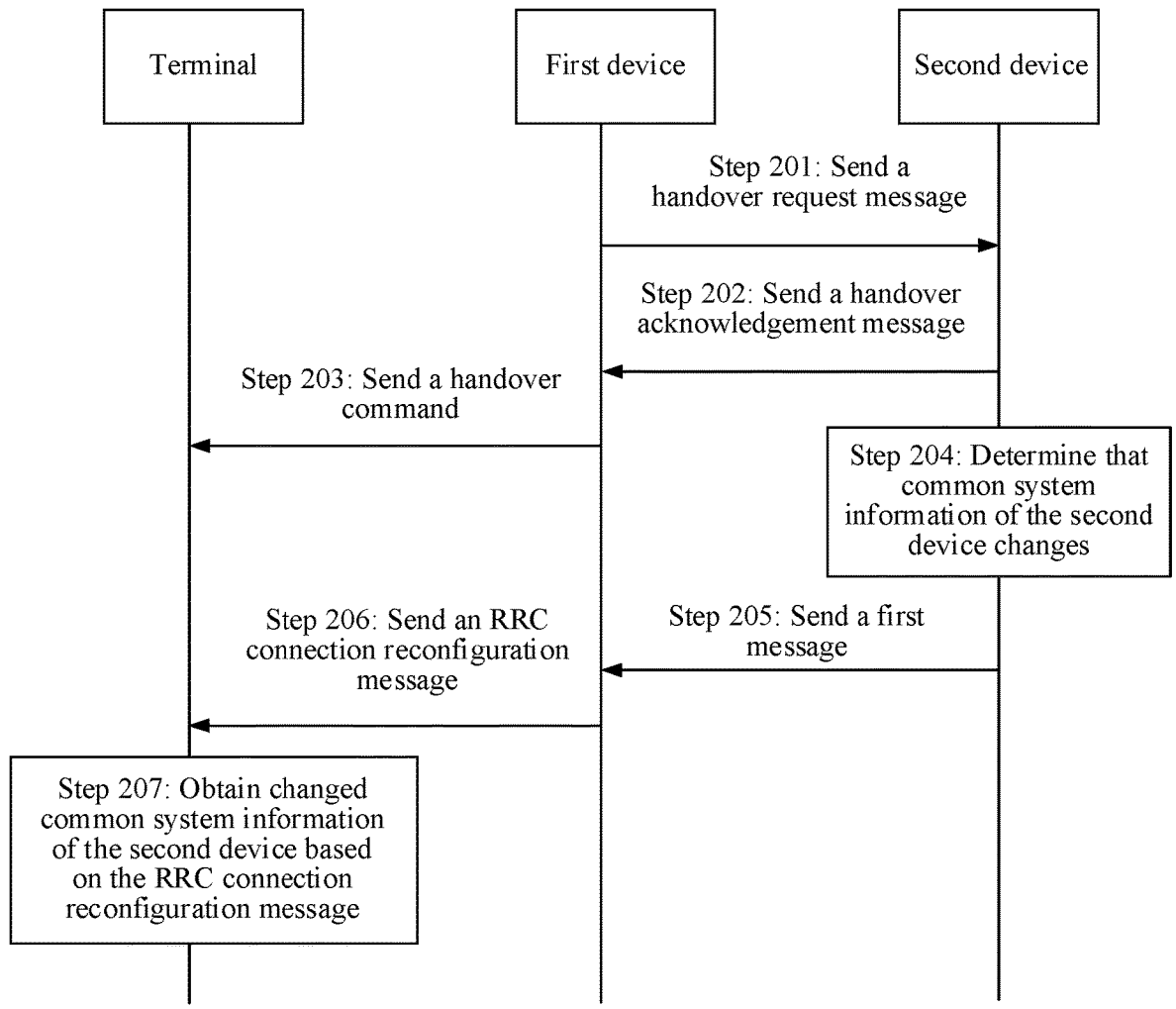
FIG. 3 is a flowchart of another communication method according to this application.

FIG. 3 is a flowchart of another communication method according to this application. An embodiment shown in FIG. 3 is an possible implementation of the embodiment shown in FIG. 2. As shown in FIG. 3, the method in this embodiment may include the following steps:

Step 201: A first device sends a handover request message to a second device, and the second device receives the handover request message sent by the first device.

Step 202: The second device sends a handover acknowledgement message to the first device, and the first device receives the handover acknowledgement message sent by the second device.

The handover acknowledgement message carries common system information of the second device.

Step 203: The first device sends a handover command to a terminal.

The terminal receives the handover command sent by the first device, where the handover command includes the common system information of the second device.

For specific descriptions of step 201 to step 203, refer to step 101 to step 103 in the embodiment shown in FIG. 2, and details are not described herein again.

Step 204: The second device determines that the common system information of the second device changes.

Step 205: The second device sends a first message to the first device, where the first message includes changed common system information of the second device.

Correspondingly, the first device receives the first message sent by the second device.

Step 206: The first device sends an RRC connection reconfiguration message to the terminal, where the RRC connection reconfiguration message includes the changed common system information of the second device.

Correspondingly, the terminal receives the RRC connection reconfiguration message sent by the first device.

Step 207: The terminal obtains the changed common system information of the second device based on the RRC connection reconfiguration message.

Specifically, when the terminal is handed over to the second device, the terminal uses the changed common system information of the second device for the handover to the second device.

In this embodiment, after sending the handover command to the terminal, the first device receives, by using the first device, the first message sent by the second device, where the first message includes the changed common system information of the second device; the first device sends the changed common system information of the second device to the terminal by using the RRC connection reconfiguration message. When the terminal is handed over to the second device, the terminal uses the changed common system information for the handover to the second device. In this way, after the common system information of the second device changes, the terminal can obtain the changed common system information of the second device in a timely manner, so that when the terminal is handed over to the second device, the terminal uses the changed common system information for the handover to the second device. This avoids a handover failure and increases a handover success rate.

Figure 4:
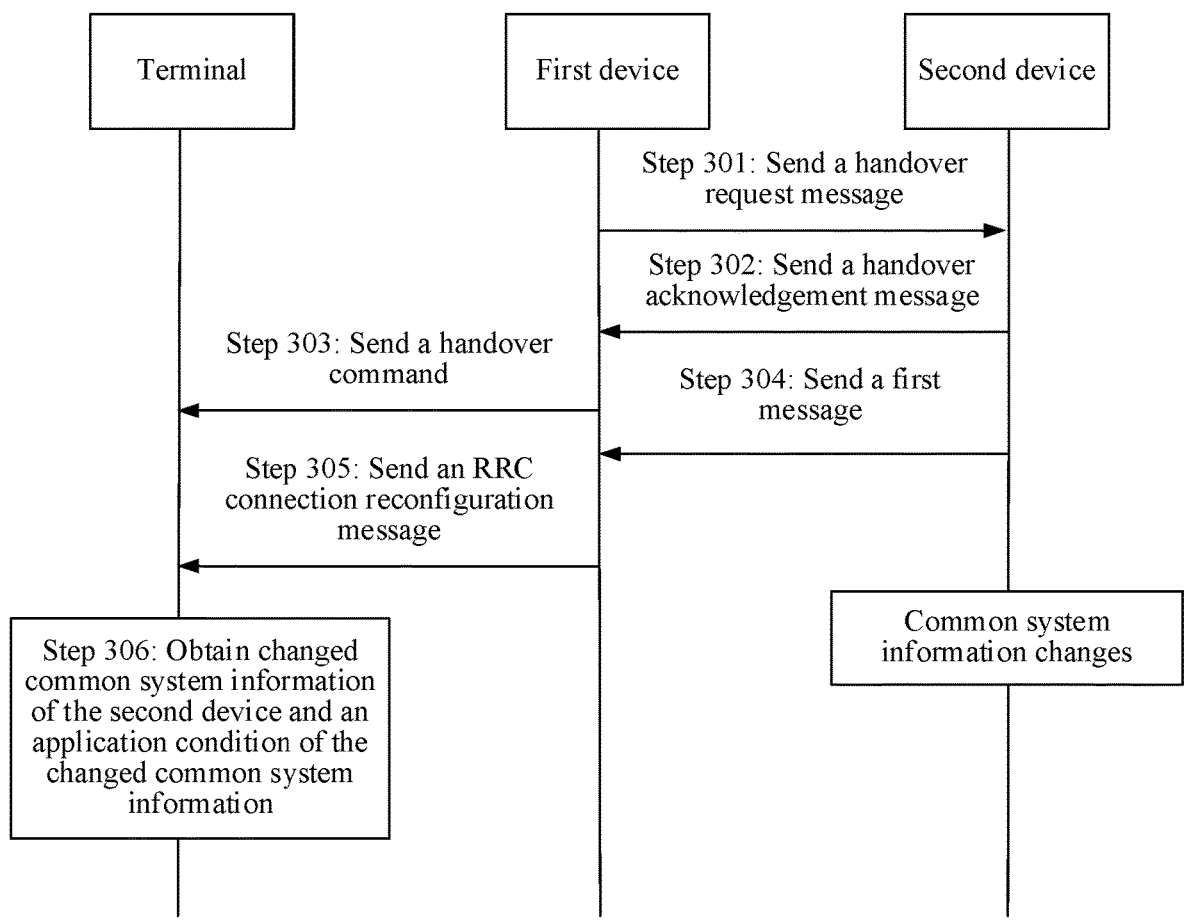
FIG. 4 is a flowchart of another communication method according to this application.

FIG. 4 is a flowchart of another communication method according to this application. A difference between an embodiment shown in FIG. 4 and the embodiment shown in FIG. 3 lies in that, in this embodiment, before the common system information changes, for example, in a period before the common system information of the second device changes, the second device indicates, to the first device, that the common system information of the second device changes. As shown in FIG. 4, the method in this embodiment may include the following steps:

Step 301: A first device sends a handover request message to a second device, and the second device receives the handover request message sent by the first device.

Step 302: The second device sends a handover acknowledgement message to the first device, and the first device receives the handover acknowledgement message sent by the second device.

The handover acknowledgement message carries common system information of the second device.

Step 303: The first device sends a handover command to a terminal.

The terminal receives the handover command sent by the first device, where the handover command includes the common system information of the second device.

For specific descriptions of step 301 to step 303, refer to step 101 to step 103 in the embodiment shown in FIG. 2, and details are not described herein again.

Step 304: The second device sends a first message to the first device, where the first message includes changed common system information of the second device and an application condition of the changed common system information.

Correspondingly, the first device receives the first message sent by the second device.

Specifically, the application condition of the changed common system information is used to indicate that the changed common system information of the second device is used when the application condition of the changed common system information is met.

For specific description of the application condition of the changed common system information, refer to the embodiment shown in FIG. 2, and details are not described herein again.

Step 305: The first device sends an RRC connection reconfiguration message to the terminal, where the RRC connection reconfiguration message includes the changed common system information of the second device and the application condition of the changed common system information.

Correspondingly, the terminal receives the RRC connection reconfiguration message sent by the first device.

Step 306: The terminal obtains the changed common system information of the second device and the application condition of the changed common system information based on the RRC connection reconfiguration message.

Specifically, the terminal may learn, based on the application condition of the changed common system information, a time at which the changed common system information of the second device is used. When the application condition of the changed common system information is met, the terminal updates the common system information of the second device by using the changed common system information of the second device.

When the terminal is handed over to the second device, the terminal uses the changed common system information of the second device for the handover to the second device.

In this embodiment, after sending the handover command to the terminal, the first device receives, by using the first device, the first message sent by the second device, where the first message includes the changed common system information of the second device and the application condition of the changed common system information; the first device sends the changed common system information of the second device and the application condition of the changed common system information to the terminal by using the RRC connection reconfiguration message; and when the application condition of the changed common system information is met, the terminal updates the common system information of the second device by using the changed common system information of the second device. In this way, after the common system information of the second device changes, the terminal can obtain the changed common system information of the second device in a timely manner, so that when the terminal is handed over to the second device, the terminal uses the changed common system information for the handover to the second device. This avoids a handover failure and increases a handover success rate.

Figure 5:
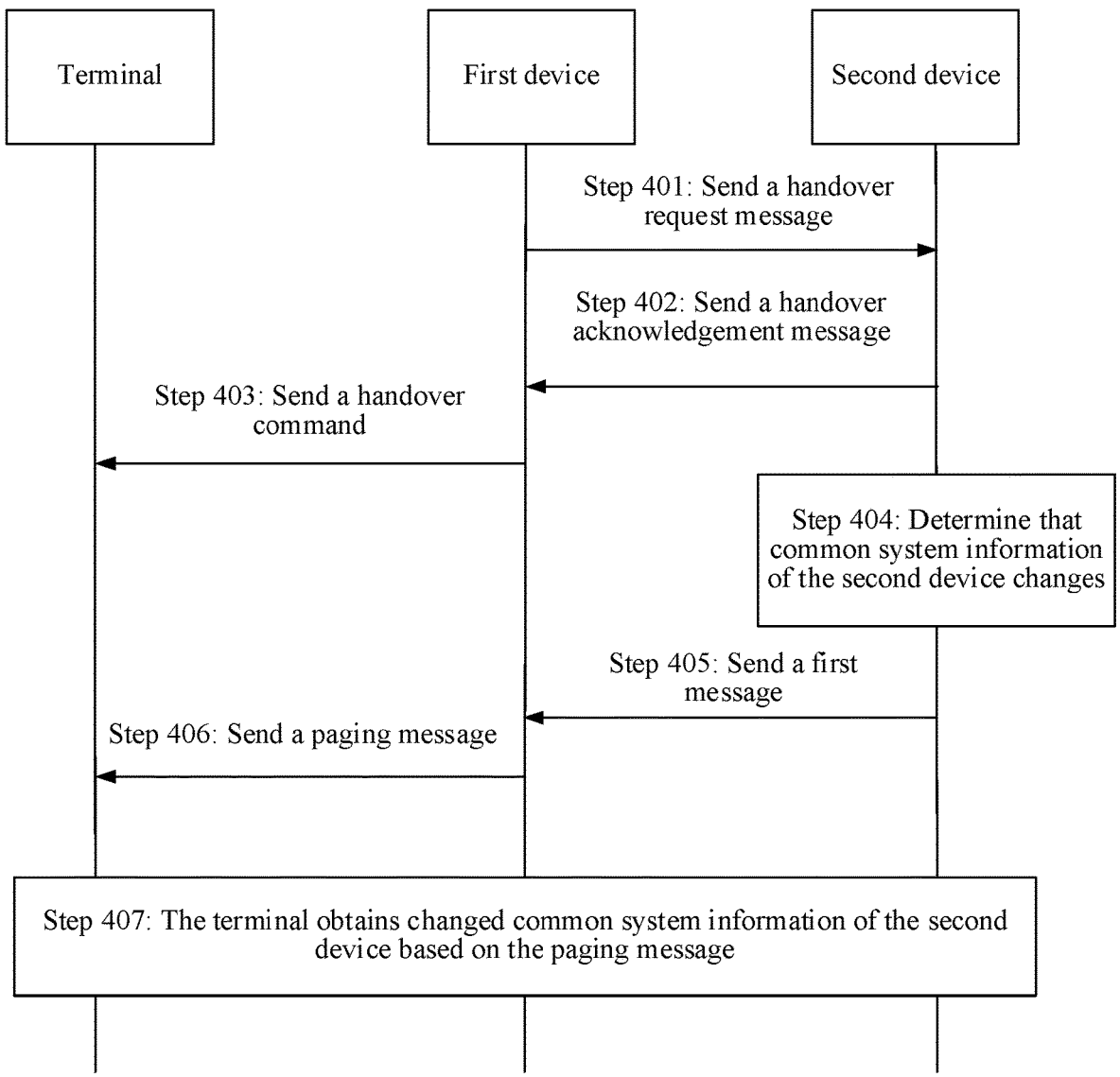
FIG. 5 is a flowchart of another communication method according to this application.

FIG. 5 is a flowchart of another communication method according to this application. An embodiment shown in FIG. 5 is an possible implementation of the embodiment shown in FIG. 2. As shown in FIG. 5, the method in this embodiment may include the following steps:

Step 401: A first device sends a handover request message to a second device, and the second device receives the handover request message sent by the first device.

Step 402: The second device sends a handover acknowledgement message to the first device, and the first device receives the handover acknowledgement message sent by the second device.

The handover acknowledgement message carries common system information of the second device.

Step 403: The first device sends a handover command to a terminal.

The terminal receives the handover command sent by the first device, where the handover command includes the common system information of the second device.

For specific descriptions of step 401 to step 403, refer to step 101 to step 103 in the embodiment shown in FIG. 2, and details are not described herein again.

Step 404: The second device determines that the common system information of the second device changes.

Step 405: The second device sends a first message to the first device, where the first message includes first change indication information of the second device.

Correspondingly, the first device receives the first message sent by the second device.

The first change indication information of the second device is used to indicate that the common system information of the second device changes.

Step 406: The first device sends a paging message to the terminal, where the paging message includes a cell identity and the first change indication information of the second device.

Correspondingly, the terminal receives the paging message sent by the first device.

Step 407: The terminal obtains changed common system information of the second device based on the paging message.

Specifically, the terminal reads, based on the paging message, system information broadcast (System Information Broadcast) of a second device corresponding to the cell identity. The system information broadcast may include a master information block (Master Information Block, MIB), a system information block (System Information Block, SIB) 1, an SIB2, and the like, and the changed common system information of the second device is obtained from the system information broadcast.

When the terminal is handed over to the second device, the terminal uses the changed common system information of the second device for the handover to the second device.

In this embodiment, after sending the handover command to the terminal, the first device receives, by using the first device, the first message sent by the second device, where the first message includes the first change indication information of the second device; the first device sends the first change indication information of the second device to the terminal by using the paging message; and the terminal obtains the changed common system information of the second device based on the paging message. In this way, after the common system information of the second device changes, the terminal can obtain the changed common system information of the second device in a timely manner, so that when the terminal is handed over to the second device, the terminal uses the changed common system information for the handover to the second device. This avoids a handover failure and increases a handover success rate.

Figure 6:
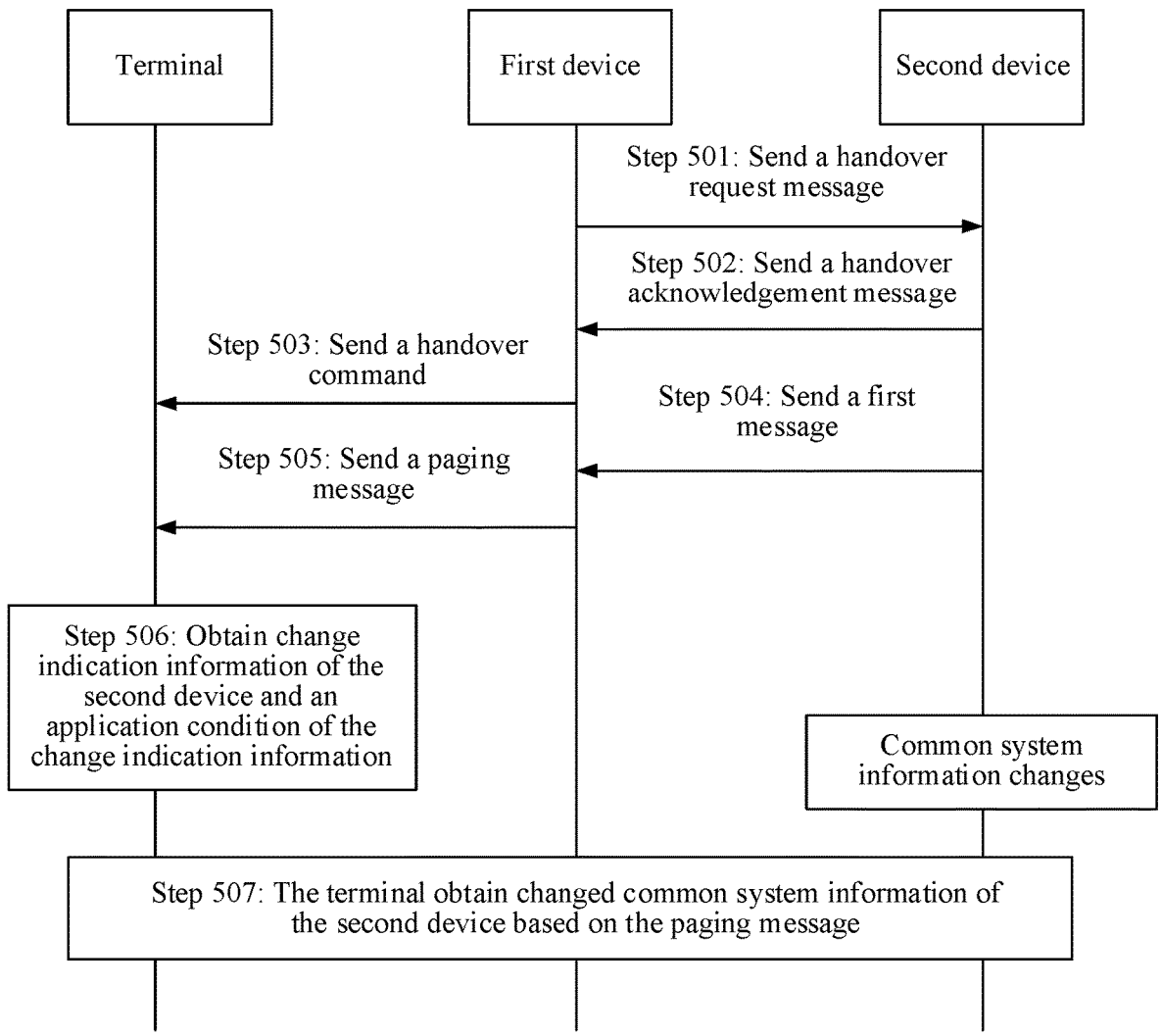
FIG. 6 is a flowchart of another communication method according to this application.

FIG. 6 is a flowchart of another communication method according to this application. A difference between an embodiment shown in FIG. 6 and the embodiment shown in FIG. 5 lies in that, in this embodiment, before the common system information changes, the second device indicates, to the first device, that the common system information of the second device changes. As shown in FIG. 6, the method in this embodiment may include the following steps:

Step 501: A first device sends a handover request message to a second device, and the second device receives the handover request message sent by the first device.

Step 502: The second device sends a handover acknowledgement message to the first device, and the first device receives the handover acknowledgement message sent by the second device.

The handover acknowledgement message carries common system information of the second device.

Step 503: The first device sends a handover command to a terminal.

The terminal receives the handover command sent by the first device, where the handover command includes the common system information of the second device.

For specific descriptions of step 501 to step 503, refer to step 101 to step 103 in the embodiment shown in FIG. 2, and details are not described herein again.

Step 504: The second device sends a first message to the first device, where the first message includes second change indication information of the second device and an application condition of the second change indication information.

Correspondingly, the first device receives the first message sent by the second device.

Specifically, the application condition of the second change indication information is used to indicate that the terminal obtains changed common system information from the second device when the application condition of the second change indication information is met.

For specific description of the application condition of the second change indication information, refer to the embodiment shown in FIG. 2, and details are not described herein again.

Step 505: The first device sends a paging message to the terminal, where the paging message includes a cell identity, the second change indication information of the second device, and the application condition of the second change indication information.

Correspondingly, the terminal receives the paging message sent by the first device.

Step 506: The terminal obtains the second change indication information of the second device and the application condition of the second change indication information based on the paging message.

Specifically, the terminal may learn, based on the application condition of the second change indication information, a time at which the second change indication information of the second device is activated.

Step 507: The terminal obtains the changed common system information of the second device based on the paging message.

Specifically, when the application condition of the second change indication information is met, the terminal reads, based on the paging message, system information broadcast (System Information Broadcast) of the second device corresponding to the cell identity. The system information broadcast may include a master information block MIB, an SIB1, an SIB2, and the like, and the changed common system information of the second device is obtained from the system information broadcast.

When the terminal is handed over to the second device, the terminal uses the changed common system information of the second device for the handover to the second device.

In this embodiment, after sending the handover command to the terminal, the first device receives, by using the first device, the first message sent by the second device, where the first message includes the second change indication information of the second device and the application condition of the second change indication information; the first device sends the second change indication information of the second device and the application condition of the second change indication information to the terminal by using the paging message; and when the application condition of the second change indication information is met, the terminal obtains the changed common system information of the second device based on the paging message. In this way, after the common system information of the second device changes, the terminal can obtain the changed common system information of the second device in a timely manner, so that when the terminal is handed over to the second device, the terminal uses the changed common system information for the handover to the second device. This avoids a handover failure and increases a handover success rate.

Figure 7:
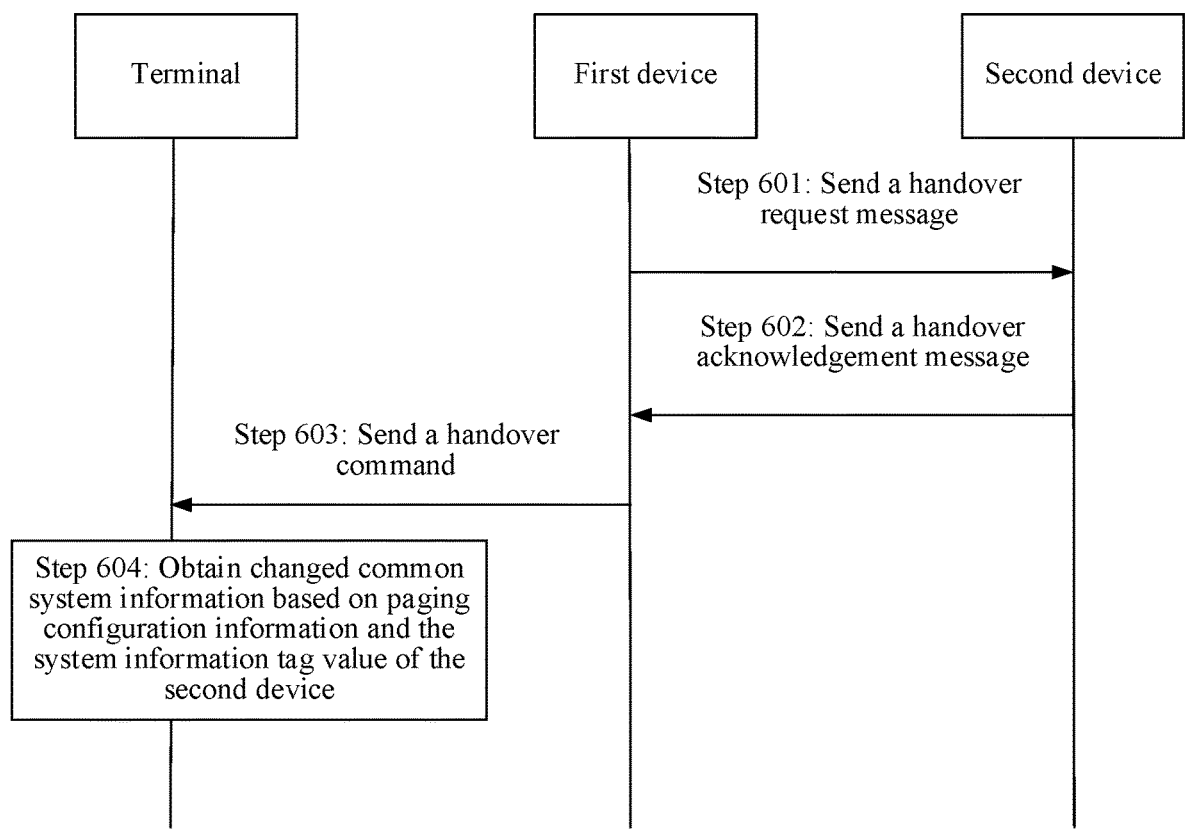
FIG. 7 is a flowchart of another communication method according to this application.

FIG. 7 is a flowchart of another communication method according to this application. As shown in FIG. 7, the method in this embodiment may include the following steps:

Step 601: A first device sends a handover request message to a second device, and the second device receives the handover request message sent by the first device.

Step 602: The second device sends a handover acknowledgement message to the first device, and the first device receives the handover acknowledgement message sent by the second device.

The handover acknowledgement message carries common system information of the second device and paging configuration information or a system information tag value of the second device.

It should be noted that, the paging configuration information or the system information tag value of the second device may alternatively be sent by using another message, for example, by using a new message. Examples are not described one by one herein.

The paging configuration information of the second device may be used by a terminal to monitor a paging message of the second device based on the paging configuration information. The system information tag value (systemInfoValueTag) may specifically be information in system information broadcast, for example, a parameter in a system information block SIB.

Step 603: The first device sends a handover command to a terminal, where the handover command carries the common system information of the second device and the paging configuration information or the system information tag value of the second device.

Correspondingly, the terminal receives the handover command sent by the first device.

The handover command may be an immediate handover command, or may be a conditional handover command (CHO Command). For specific description, refer to step 103 in the embodiment shown in FIG. 2, and details are not described herein again.

Step 604: The terminal obtains changed common system information based on the paging configuration information or the system information tag value of the second device.

When the terminal is handed over to the second device, the terminal uses the changed common system information for the handover to the second device.

It should be noted that, one second device is used as an example for description in this embodiment. When there are a plurality of second devices in a network, each second device may perform the method steps performed by the foregoing second device. To be specific, each of the plurality of second devices separately sends common system information of the second device and paging configuration information or a system information tag values of the second device to the first device. The handover command may be one handover command that carries common system information of one or more second devices and paging configuration information or a system information tag value, or may be a plurality of handover commands, where each handover command carries common system information of one or more second devices and paging configuration information or a system information tag value. The terminal can obtain changed common system information of each second device based on the paging configuration information or the system information tag value of the one or more second devices. When the terminal is handed over to one of the second devices, the terminal uses the changed common system information of the second device for the handover to the second device.

In this embodiment, the first device receives the handover acknowledgement message sent by the second device, where the handover acknowledgement message carries the common system information of the second device and the paging configuration information or the system information tag value; the first device sends the handover command to the terminal, where the handover command carries the common system information of the second device and the paging configuration information or the system information tag value of the second device; and the terminal obtains the changed common system information based on the paging configuration information or the system information tag value of the second device. In this way, after the common system information of the second device changes, the terminal can obtain the changed common system information of the second device in a timely manner, so that when the terminal is handed over to the second device, the terminal uses the changed common system information for the handover to the second device. This avoids a handover failure and increases a handover success rate.

It should be noted that, that common system information of one second device changes is used as an example for description in the embodiments shown in FIG. 2 to FIG. 6. When common system information of another second device changes, the another second device may perform the same method steps as the foregoing second device. Details are not described herein again.

The technical solution in the method embodiment shown in FIG. 7 is described in detail below by using two specific embodiments.

Figure 8:
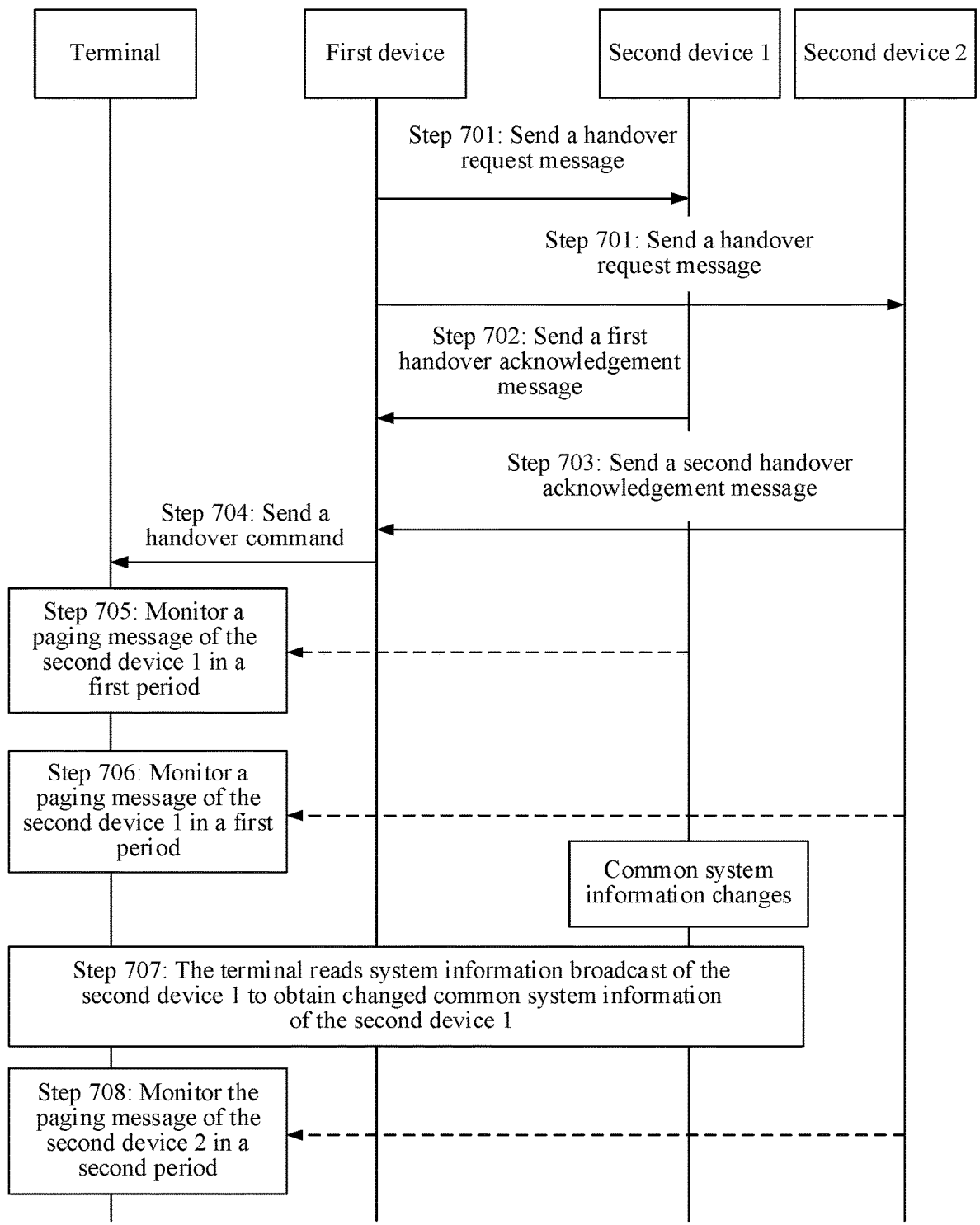
FIG. 8 is a flowchart of another communication method according to this application.

FIG. 8 is a flowchart of another communication method according to this application. Two second devices are used as an example for description in this embodiment. The two second devices are a second device 1 and a second device 2. As shown in FIG. 8, the method in this embodiment may include the following steps:

Step 701: A first device sends a handover request message to each of the second device 1 and the second device 2, the second device 1 receives the handover request message sent by the first device, and the second device 2 receives the handover request message sent by the first device.

Step 702: The second device 1 sends a first handover acknowledgement message to the first device, where the first handover acknowledgement message carries common system information of the second device 1 and paging configuration information of the second device 1.

Correspondingly, the first device receives the first handover acknowledgement message sent by the second device 1.

The paging configuration information of the second device 1 may be used by a terminal to monitor a paging message of the second device 1 based on the paging configuration information.

Step 703: The second device 2 sends a second handover acknowledgement message to the first device, where the second handover acknowledgement message carries common system information of the second device 2 and paging configuration information of the second device 2.

Correspondingly, the first device receives the second handover acknowledgement message sent by the second device 2.

The paging configuration information of the second device 2 may be used by the terminal to monitor a paging message of the second device 2 based on the paging configuration information.

It should be noted that, a sequence of step 702 and step 703 is not limited by a sequence number.

Step 704: The first device sends a handover command to a terminal, where the handover command carries the common system information of the second device 1, the common system information of the second device 2, the paging configuration information of the second device 1, and the paging configuration information of the second device 2.

Step 705: The terminal monitors the paging message of the second device 1 in a first period based on the paging configuration information of the second device 1.

Specifically, the terminal periodically checks the paging message of the second device 1. In an possible implementation, the terminal specifically checks whether the paging message carries system information modification indication (systemInfoModification) information. If the paging message carries the system information modification indication information and a cell identity of the second device 1, the terminal reads system information broadcast of the second device 1 in a next period, to obtain changed common system information of the second device 1.

The system information modification indication information may be 1-bit information.

Step 706: The terminal monitors the paging message of the second device 2 in a first period based on the paging configuration information of the second device 2.

Specifically, the terminal periodically checks the paging message of the second device 2. In an possible implementation, the terminal specifically checks whether the paging message carries system information modification indication (systemInfoModification) information. If the paging message carries the system information modification indication and a cell identity of the second device 2, the terminal reads system information broadcast of the second device 2 in a next period, to obtain changed common system information of the second device 2.

That the paging message in step 705 carries the system information modification indication and the paging message in step 706 does not carry the system information modification indication is used as an example for description in this embodiment.

Step 707: The terminal reads the system information broadcast (System Information Broadcast) of the second device 1 to obtain the changed common system information of the second device 1.

When the terminal is handed over to the second device 1, the terminal uses the changed common system information for the handover to the second device 1.

Step 708: The terminal monitors the paging message of the second device 2 in a second period based on the paging configuration information of the second device 2.

In this embodiment, the first device receives the first handover acknowledgement message sent by the second device 1, where the first handover acknowledgement message carries the paging configuration information of the second device 1; the first device receives the second handover acknowledgement message sent by the second device 2, where the second handover acknowledgement message carries the paging configuration information of the second device 2; the first device sends the handover command to the terminal, where the handover command carries the paging configuration information of the second device 1 and the second device 2; and the terminal obtains the paging messages of the second device 1 and the second device 2 based on the paging configuration information of the second device 1 and the second device 2, determines whether the common system information of the second device 1 and the second device 2 changes, and obtains the changed common system information when the common system information changes. In this way, after the common system information of the second devices changes, the terminal can obtain the changed common system information of the second devices in a timely manner, so that when the terminal is handed over to the second devices, the terminal uses the changed common system information for the handover to the second devices. This avoids a handover failure and increases a handover success rate.

It should be noted that, the "handover command" in FIG. 7 to FIG. 10 in this application may be one handover command, where the handover command includes paging configuration information or a system information tag value of one or more second devices; or may be a plurality of handover commands, where each handover command includes paging configuration information or a system information tag value of one or more second devices.

Figure 9:
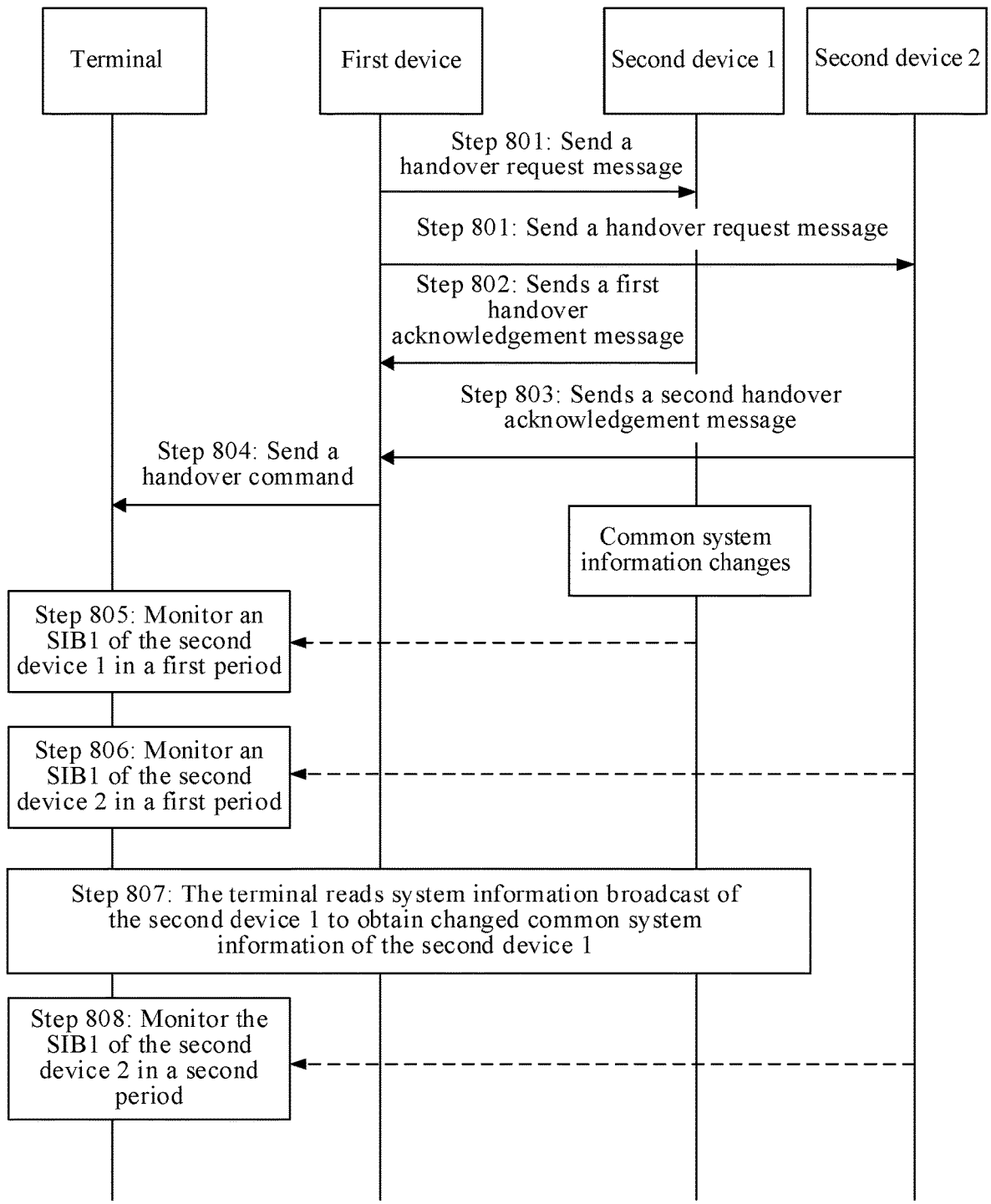
FIG. 9 is a flowchart of another communication method according to this application.

FIG. 9 is a flowchart of another communication method according to this application. A difference between an embodiment and the embodiment shown in FIG. 8 lies in that the first message carries a system information tag value. As shown in FIG. 9, the method in this embodiment may include the following steps:

Step 801: A first device sends a handover request message to each of a second device 1 and a second device 2, the second device 1 receives the handover request message sent by the first device, and the second device 2 receives the handover request message sent by the first device.

Step 802: The second device 1 sends a first handover acknowledgement message to the first device, where the first handover acknowledgement message carries common system information of the second device 1 and a system information tag value of the second device 1.

Correspondingly, the first device receives the first handover acknowledgement message sent by the second device 1.

The system information tag value of the second device 1 may be used by a terminal to determine, after an SIB1 of the second device 1 is periodically read, whether the common system information of the second device 1 changes.

Step 803: The second device 2 sends a second handover acknowledgement message to the first device, where the second handover acknowledgement message carries common system information of the second device 2 and a system information tag value of the second device 2.

Correspondingly, the first device receives the second handover acknowledgement message sent by the second device 2.

The system information tag value of the second device 2 may be used by the terminal to determine, after an SIB1 of the second device 2 is periodically read, whether the common system information of the second device 2 changes.

Step 804: The first device sends a handover command to a terminal, where the handover command carries the common system information of the second device 1, the common system information of the second device 2, the system information tag value of the second device 1, and the system information tag value of the second device 2.

That the common system information of the second device 1 changes before step 805 is used as an example for description in this embodiment.

Step 805: The terminal monitors the SIB1 of the second device 1 in a first period.

Specifically, the terminal periodically checks the SIB1 of the second device 1. When a system information tag value of the SIB1 is different from the system information tag value of the second device 1 that is carried in the handover command, the terminal determines that the system information of the second device 1 changes, and then performs step 807. When a system information tag value of the SIB1 is the same as the system information tag value of the second device 1 that is carried in the handover command, the terminal determines that the system information of the second device 1 is unchanged, and then continues to monitor the SIB1 of the second device 1.

Step 806: The terminal monitors the SIB1 of the second device 2 in a first period.

Specifically, the terminal periodically checks the SIB1 of the second device 2. When a system information tag value of the SIB1 is different from the system information tag value of the second device 2 that is carried in the handover command, the terminal determines that the system information of the second device 2 changes, and then reads system information broadcast of the second device 2, to obtain changed common system information of the second device 2. When a system information tag value of the SIB1 is the same as the system information tag value of the second device 2 that is carried in the handover command, the terminal determines that the system information of the second device 2 is unchanged, and then performs step 808.

Because the common system information of the second device 1 changes before step 805, in step 805, the system information tag value of the SIB1 is different from the system information tag value of the second device 1 that is carried in the handover command. On the contrary, because the common system information of the second device 2 is unchanged, in step 806, the system information tag value of the SIB1 is the same as the system information tag value of the second device 2 that is carried in the handover command.

Step 807: The terminal reads system information broadcast (System Information Broadcast) of the second device 1 to obtain changed common system information of the second device 1.

When the terminal is handed over to the second device 1, the terminal uses the changed common system information for the handover to the second device, and compares the system information tag value of the SIB1 read in step 806 with a system information tag value of the SIB1, of the second device 1, monitored in a third period.

It should be noted that, step 807 may specifically be performed after step 805, and a sequence of step 807 and step 806 is not limited by a sequence number.

Step 808: The terminal monitors the SIB1 of the second device 2 in a second period.

In this embodiment, the first device receives the first handover acknowledgement message sent by the second device 1, where the first handover acknowledgement message carries the system information tag value of the second device 1; the first device receives the second handover acknowledgement message sent by the second device 2, where the second handover acknowledgement message carries the system information tag value of the second device 2; the first device sends the handover command to the terminal, where the handover command carries the system information tag values of the second device 1 and the second device 2; and the terminal determines, based on the system information tag values of the second device 1 and the second device 2, whether the common system information of the second device 1 and the second device 2 changes, and obtains the changed common system information when the common system information changes. In this way, after the common system information of the second devices changes, the terminal can obtain the changed common system information of the second devices in a timely manner, so that when the terminal is handed over to the second devices, the terminal uses the changed common system information for the handover to the second devices. This avoids a handover failure and increases a handover success rate.

Figure 10:
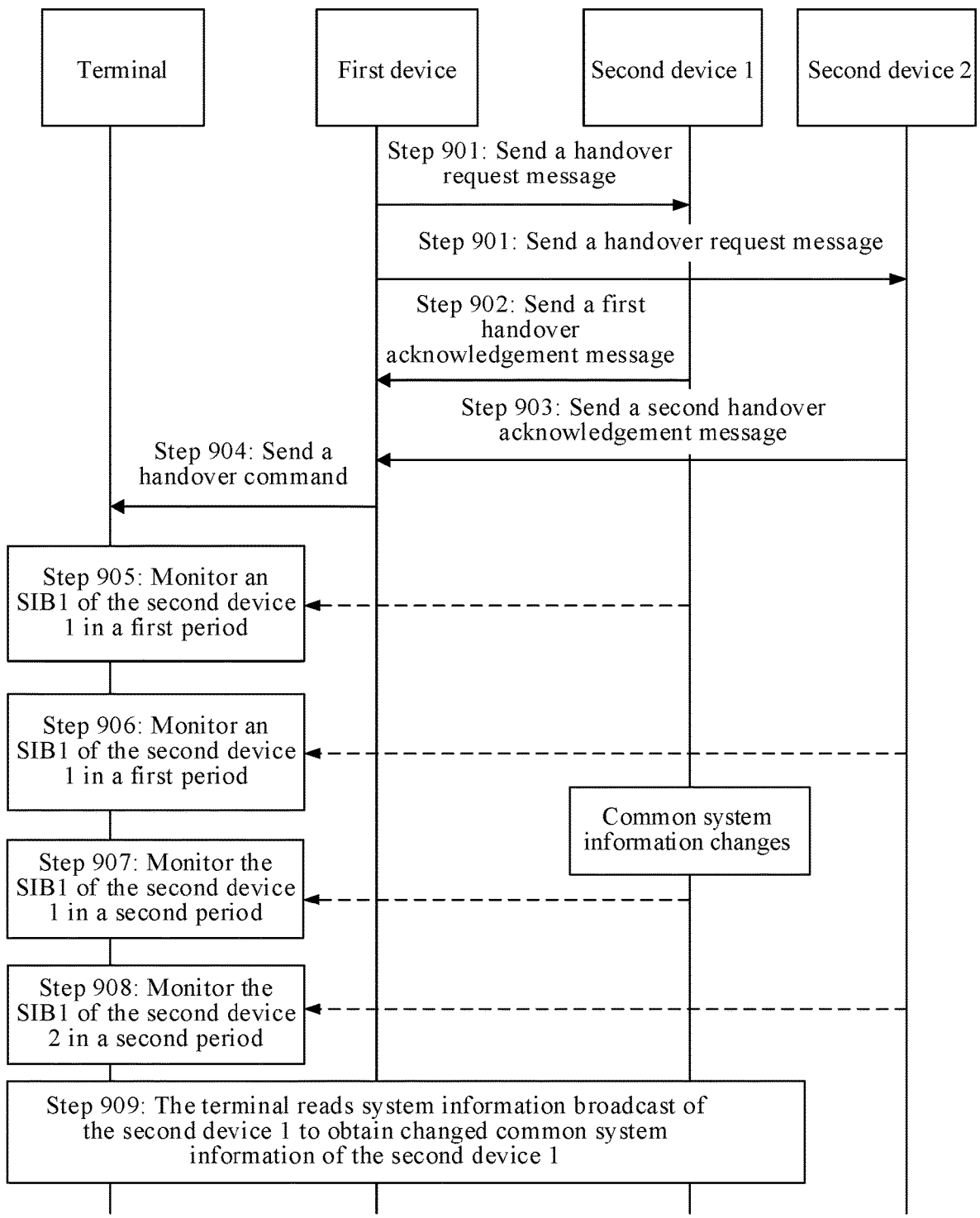
FIG. 10 is a flowchart of another communication method according to this application.

FIG. 10 is a flowchart of another communication method according to this application. A difference between an embodiment and the embodiment shown in FIG. 9 lies in that the first message does not carry a system information tag value. As shown in FIG. 10, the method in this embodiment may include the following steps:

Step 901: A first device sends a handover request message to each of a second device 1 and a second device 2, the second device 1 receives the handover request message sent by the first device, and the second device 2 receives the handover request message sent by the first device.

Step 902: The second device 1 sends a first handover acknowledgement message to the first device.

Correspondingly, the first device receives the first handover acknowledgement message sent by the second device 1. The first message may carry common system information of the second device 1.

Step 903: The second device 2 sends a second handover acknowledgement message to the first device.

Correspondingly, the first device receives the second handover acknowledgement message sent by the second device 2. The handover acknowledgement message may carry common system information of the second device 2.

Step 904: The first device sends a handover command to a terminal, where the handover command carries the common system information of the second device 1 and the common system information of the second device 2.

Correspondingly, the terminal receives the handover command sent by the first device.

Step 905: The terminal monitors an SIB1 of the second device 1 in a first period, to obtain a system information tag value of the second device 1.

Specifically, the terminal records a system information tag value of the SIB1, and uses the system information tag value of the SIB1 as the system information tag value of the second device 1.

That the common system information of the second device 1 changes after step 905 is used as an example for description in this embodiment.

Step 906: The terminal monitors an SIB1 of the second device 2 in a first period, to obtain a system information tag value of the second device 2.

Specifically, the terminal records a system information tag value of the SIB1, and uses the system information tag value of the SIB1 as the system information tag value of the second device 2.

Step 907: The terminal monitors the SIB1 of the second device 1 in a second period, to obtain a system information tag value of the second device 1.

Specifically, the terminal compares the system information tag value of the SIB1 of the second device 1 in the second period with the system information tag value of the second device 1 in the first period. When the system information tag value of the SIB1 of the second device 1 in the second period is different from the system information tag value of the second device 1 in the first period, the terminal determines that the system information of the second device 1 changes, and then performs step 909. If the system information tag value of the SIB1 of the second device 1 in the second period is the same as the system information tag value of the second device 1 in the first period, the terminal determines that the system information of the second device 1 is unchanged, and then continues to monitor the SIB1 of the second device 1.

Step 908: The terminal monitors the SIB1 of the second device 2 in a second period, to obtain a system information tag value of the second device 2.

Specifically, the terminal compares the system information tag value of the SIB1 of the second device 2 in the second period with the system information tag value of the second device 2 in the first period. If the system information tag value of the SIB1 of the second device 2 in the second period is different from the system information tag value of the second device 2 in the first period, the terminal determines that the system information of the second device 2 changes, and then reads system information broadcast of the second device 2 to obtain changed common system information of the second device 2. If the system information tag value of the SIB1 of the second device 2 in the second period is the same as the system information tag value of the second device 2 in the first period, the terminal determines that the system information of the second device 2 is unchanged, and then continues to monitor the SIB1 of the second device 2.

That the system information tag value of the SIB1 of the second device 1 in the second period is different from the system information tag value of the second device 1 in the first period in step 907 and the system information tag value of the SIB1 of the second device 2 in the second period is the same as the system information tag value of the second device 2 in the first period in step 908 is used as an example for description in this embodiment.

Step 909: The terminal reads system information broadcast (System Information Broadcast) of the second device 1 to obtain changed common system information of the second device 1.

When the terminal is handed over to the second device 1, the terminal uses the changed common system information for the handover to the second device.

It should be noted that, step 909 may be performed after step 907, and a sequence of step 909 and step 908 is not limited by a sequence number.

In this embodiment, after the common system information of the second devices changes, the terminal can obtain the changed common system information of the second devices in a timely manner, so that when the terminal is handed over to the second devices, the terminal uses the changed common system information for the handover to the second devices. This avoids a handover failure and increases a handover success rate.

It should be noted that, two periods are used as an example for description in FIG. 8 to FIG. 10. Specific implementations of other periods are the same as those of the two periods, and details are not described herein again.

It may be understood that, in the foregoing embodiments, the methods or steps implemented by the first device may alternatively be implemented by a chip inside the first device. The methods or steps implemented by the terminal may alternatively be implemented by a chip inside the terminal. The methods or steps implemented by the second device may alternatively be implemented by a chip inside the second device.

Figure 11:
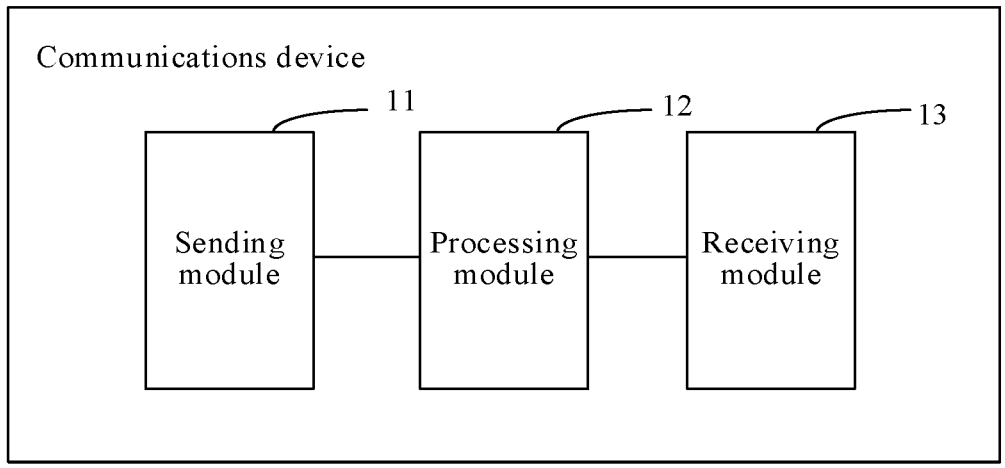
FIG. 11 is a schematic structural diagram of a communications device according to this application.

FIG. 11 is a schematic structural diagram of a communications device according to this application. The communications device in this embodiment serves as a first device. As shown in FIG. 11, the apparatus in this embodiment may include a sending module 11, a processing module 12, and a receiving module 13. The processing module 12 sends a handover request message to a terminal by using the sending module 11; the receiving module 13 is configured to receive a handover acknowledgement message returned by a second device, where the handover acknowledgement message carries common system information of the second device; the processing module 12 sends a handover command to the terminal by using the sending module 11, where the handover command includes the common system information of the second device; and the processing module 12 further sends, by using the sending module 11, a second message to the terminal based on a first message, so that the terminal obtains changed communications system information of the second device based on the second message, where the first message is sent by the second device, and the first message is used to indicate a change occurring in the common system information of the second device.

Optionally, the first message includes the changed common system information of the second device, or the changed common system information of the second device and an application condition of the changed common system information.

Optionally, the first message includes first change indication information of the second device, or second change indication information of the second device and an application condition of the second change indication information. The first change indication information of the second device is used to indicate that the common system information of the second device has changed, and the second change indication information is used to indicate that the common system information of the second device changes when the application condition is met.

Optionally, the second message includes the changed common system information of the second device, or the changed common system information of the second device and the application condition of the changed common system information.

Optionally, the second message includes the first change indication information of the second device, or the second change indication information of the second device and the application condition of the second change indication information. The first change indication information of the second device is used to indicate that the common system information of the second device has changed, and the second change indication information is used to indicate that the common system information of the second device changes when the application condition is met.

Optionally, the application condition of the changed common system information or the application condition of the second change indication information includes the following: A timer expires, or a system time reaches a first system time, or a system frame number reaches a first system frame number. The system time is a system time of either the first device or the second device, and the system frame number is a system frame number of either the first device or the second device.

The apparatus in this embodiment may be configured to execute the technical solution in any one of the method embodiments shown in FIG. 2 to FIG. 6. Implementation principles and technical effects of the apparatus are similar to those in the method embodiments, and details are not described herein again.

Figure 12:
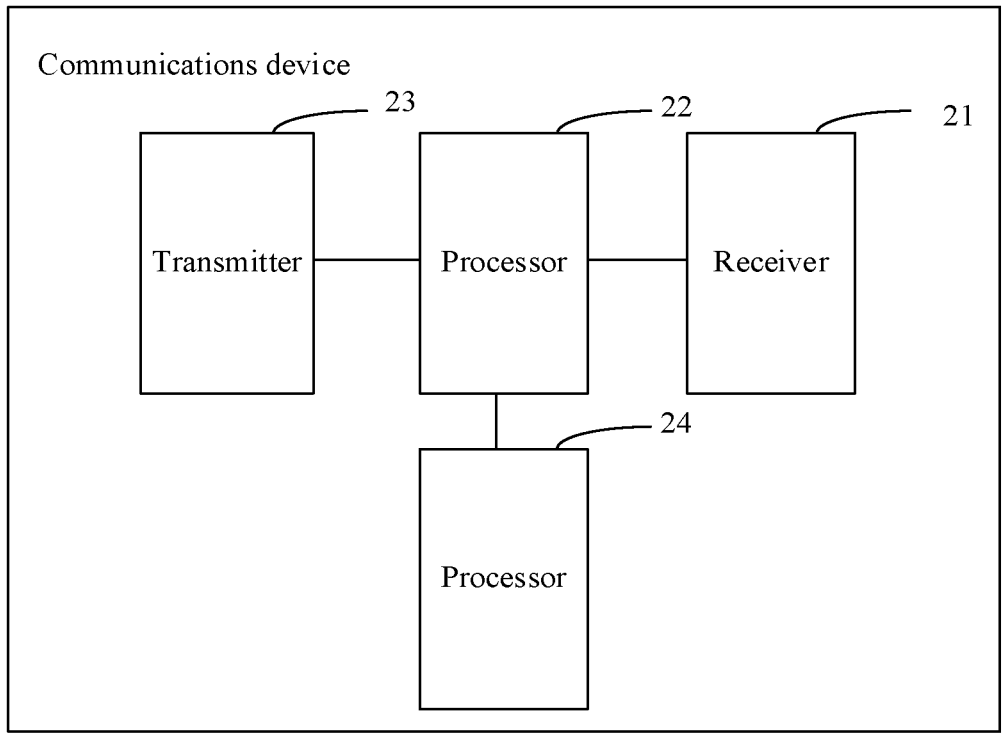
FIG. 12 is a schematic structural diagram of another communications device according to this application.

FIG. 12 is a schematic structural diagram of another communications device according to this application. The communications device serves as a first device. As shown in FIG. 12, the communications device in this embodiment includes a receiver 21, a processor 22, and a transmitter 23.

During hardware implementation, the receiving module 13 may be the receiver 21 in this embodiment; the receiver 21 may also correspond to a transceiver; the sending module 11 may be the transmitter 23 in this embodiment, and the transmitter 23 may also correspond to a transceiver; and the processing module 12 may be built in or independent of the processor 22 of the first device in a hardware form.

The receiver 21 and the transmitter 23 may include a necessary radio frequency communications device such as a mixer. The processor 22 may include at least one of a central processing unit (Central Processing Unit, CPU), a digital signal processor (digital signal processor, DSP), a micro controller unit (Microcontroller Unit, MCU), an application-specific integrated circuit (Application Specific Integrated Circuit, ASIC), or a field programmable logic gate array (Field-Programmable Gate Array, FPGA).

Optionally, the communications device in this embodiment may further include a memory 24. The memory 24 is configured to store a program instruction, and the processor 22 is configured to invoke the program instruction in the memory 24 to execute the foregoing solutions.

The program instruction may be implemented in a form of a software functional unit and can be sold or used as an independent product. The memory 24 may be a computer-readable storage medium in any form. Based on such understanding, all or some of the technical solutions in this application may be represented in a form of a software product, and the software product includes several instructions for instructing a computer device, which may specifically be the processor 22, to perform all or some of the steps of the first device in the embodiments of this application. In addition, the computer-readable storage medium includes various media that can store program code, such as a USB flash drive, a removable hard disk, a read-only memory (Read-Only Memory, ROM), a random access memory (Random Access Memory, RAM), a magnetic disk, or an optical disk.

The first device described in this embodiment may be configured to execute the technical solutions executed by the first device or the chip inside the first device in the foregoing method embodiments. Implementation principles and technical effects of the first device are similar to those in the method embodiments. For functions of the components, refer to the corresponding descriptions in the method embodiments, and details are not described herein again.

Figure 13:
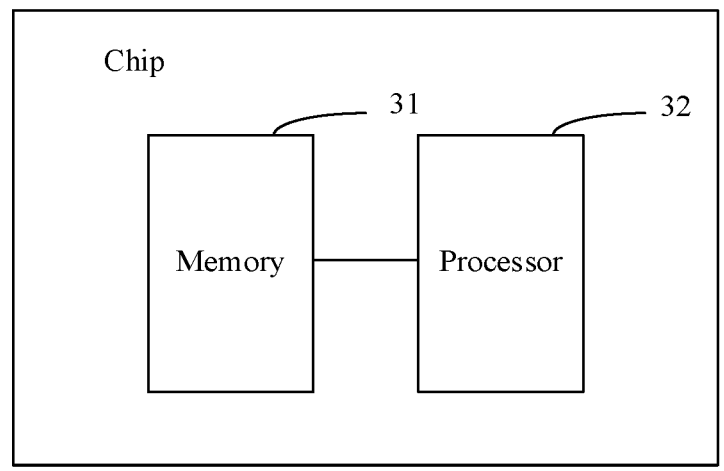
FIG. 13 is a schematic structural diagram of a chip according to this application.

FIG. 13 is a schematic structural diagram of a chip according to this application. As shown in FIG. 13, the chip in this embodiment may be the chip inside the first device, and the chip in this embodiment may include a memory 31 and a processor 32. The memory 31 is in a communication connection to the processor 32. It should be noted that, the chip may further include another structure or unit that forms the chip, for example, an interface or a slot. This is not limited herein.

During hardware implementation, the receiving module 11, the processing module 12, and the sending module 13 may be built in or independent of the processor 32 of the chip in a hardware form.

The memory 31 is configured to store a program instruction, and the processor 32 is configured to invoke the program instruction in the memory 31 to execute the foregoing solutions.

The chip described in this embodiment may be configured to execute the technical solutions executed by the first device or the chip inside the first device in the foregoing method embodiments of this application. Implementation principles and technical effects of the chip are similar to those in the method embodiments. For functions of the modules, refer to the corresponding descriptions in the method embodiments, and details are not described herein.

Figure 14:
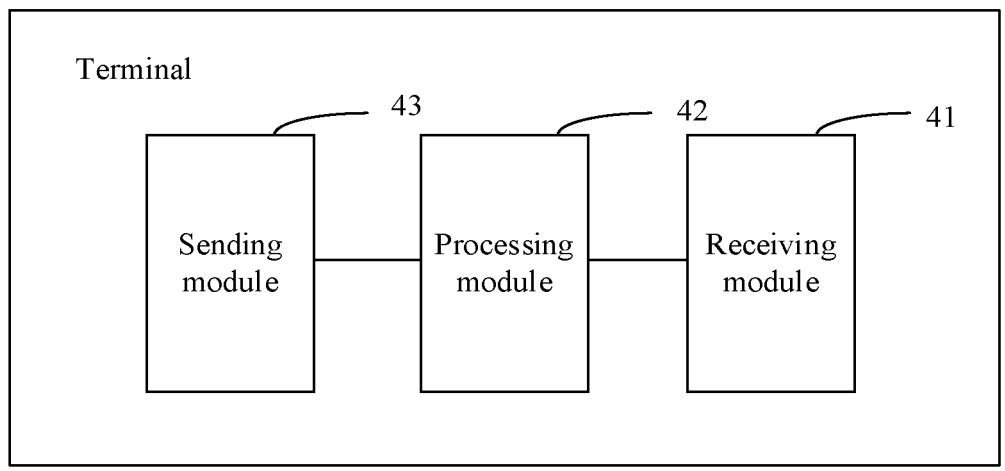
FIG. 14 is a schematic structural diagram of a terminal according to this application.

FIG. 14 is a schematic structural diagram of a terminal according to this application. As shown in FIG. 14, the apparatus in this embodiment may include a receiving module 41 and a processing module 42. The receiving module 41 is configured to receive a handover command sent by a first device, where the handover command includes common system information of a second device; the receiving module 42 is further configured to receive a second message sent by the first device, where the second message is used to indicate a change occurring in the common system information of the second device; and the processing module 42 is configured to obtain changed common system information of the second device based on the second message.

Optionally, the second message includes the changed common system information of the second device, and that the processing module 42 is configured to obtain the changed common system information of the second device based on the second message may specifically include: the processing module 42 is configured to update the common system information of the second device based on the changed common system information of the second device.

Optionally, the second message includes the changed common system information and an application condition of the changed common system information, and that the processing module 42 is configured to obtain the changed common system information of the second device based on the second message may specifically include: the processing module 42 is configured to update the common system information of the second device based on the changed common system information of the second device when the application condition is met.

Optionally, the second message includes first change indication information of the second device, and that the processing module 42 is configured to obtain the changed common system information of the second device based on the second message may specifically include: the processing module 42 is configured to obtain the changed common system information of the second device based on the first change indication information of the second device.

Optionally, the second message includes second change indication information of the second device and an application condition of the second change indication information, and that the processing module 42 is configured to obtain the changed common system information of the second device based on the second message may specifically include: the processing module 42 is configured to obtain the changed common system information of the second device based on the second change indication information of the second device when the application condition is met.

Optionally, that the receiving module 41 is configured to receive the second message sent by the first device may specifically include: the receiving module 41 is configured to receive a paging message sent by the first device, where the paging message carries the second message.

Optionally, the paging message further carries a cell identity, and that the processing module 42 is configured to obtain the changed common system information of the second device based on the first change indication information of the second device may specifically include: the processing module 42 is configured to obtain changed common system information of a second device corresponding to the cell identity, based on the first change indication information and the cell identity.

Optionally, the paging message further carries a cell identity, and that the processing module 42 is configured to obtain the changed common system information of the second device based on the second change indication information of the second device may specifically include: the processing module 42 is configured to obtain changed common system information of a second device corresponding to the cell identity, based on the second change indication information and the cell identity when the application condition is met.

Optionally, the terminal may further include a sending module 43, configured to send information or a message to another device.

The apparatus in this embodiment may be configured to execute the technical solution in any one of the method embodiments shown in FIG. 2 to FIG. 6. Implementation principles and technical effects of the apparatus are similar to those in the method embodiments, and details are not described herein again.

Figure 15:
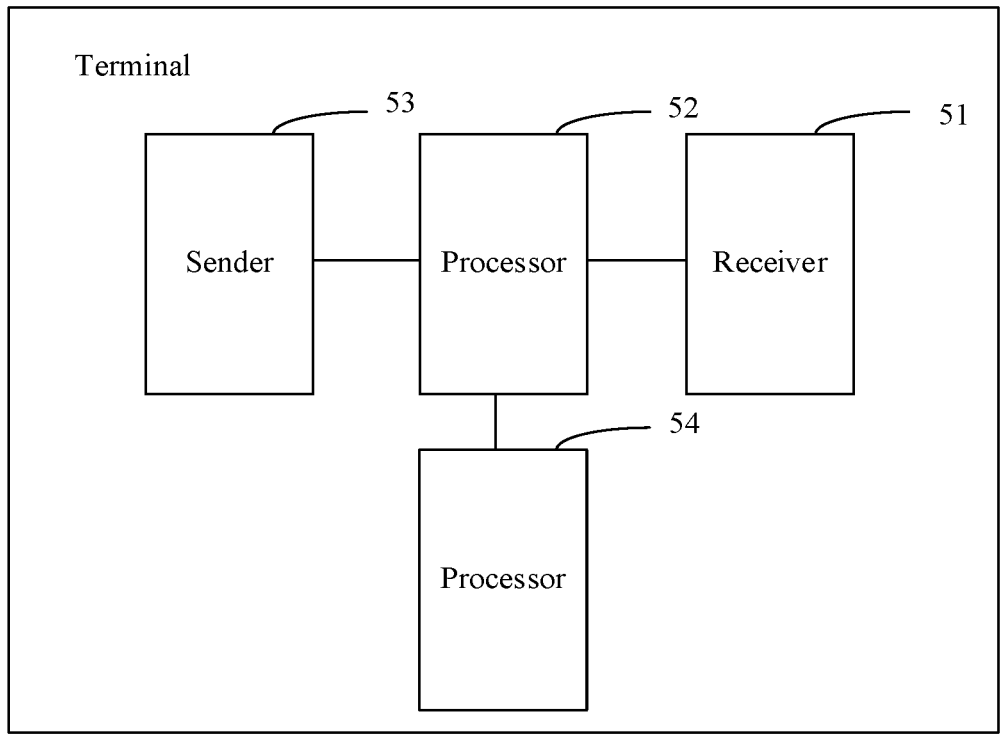
FIG. 15 is a schematic structural diagram of another terminal according to this application.

FIG. 15 is a schematic structural diagram of another terminal according to this application. As shown in FIG. 15, the terminal in this embodiment includes a receiver 51 and a processor 52.

During hardware implementation, the receiving module 41 may be the receiver 51 in this embodiment, and the receiver 51 may also correspond to a transceiver. Optionally, the terminal in this embodiment may further include a transmitter 53. The sending module 43 may be the transmitter 53 in this embodiment, and the transmitter 53 may also correspond to a transceiver. The processing module 42 may be built in or independent of the processor 52 of the terminal in a hardware form.

The receiver 51 and the transmitter 53 may include a necessary radio frequency communications device such as a mixer. The processor 52 may include at least one of a central processing unit (Central Processing Unit, CPU), a digital signal processor (digital signal processor, DSP), a micro controller unit (Microcontroller Unit, MCU), an application-specific integrated circuit (Application Specific Integrated Circuit, ASIC), or a field programmable logic gate array (Field-Programmable Gate Array, FPGA).

Optionally, the terminal in this embodiment may further include a memory 54. The memory 54 is configured to store a program instruction, and the processor 52 is configured to invoke the program instruction in the memory 54 to execute the foregoing solutions.

The program instruction may be implemented in a form of a software functional unit and can be sold or used as an independent product. The memory 54 may be a computer-readable storage medium in any form. Based on such understanding, all or some of the technical solutions in this application may be represented in a form of a software product, and the software product includes several instructions for instructing a computer device, which may specifically be the processor 52, to perform all or some of the steps of the terminal in the embodiments of this application. In addition, the computer-readable storage medium includes various media that can store program code, such as a USB flash drive, a removable hard disk, a read-only memory (Read-Only Memory, ROM), a random access memory (Random Access Memory, RAM), a magnetic disk, or an optical disk.

The terminal described in this embodiment may be configured to execute the technical solutions executed by the terminal or the chip inside the terminal in the foregoing method embodiments. Implementation principles and technical effects of the terminal are similar to those in the method embodiments. For functions of the components, refer to the corresponding descriptions in the method embodiments, and details are not described herein again.

Figure 16:
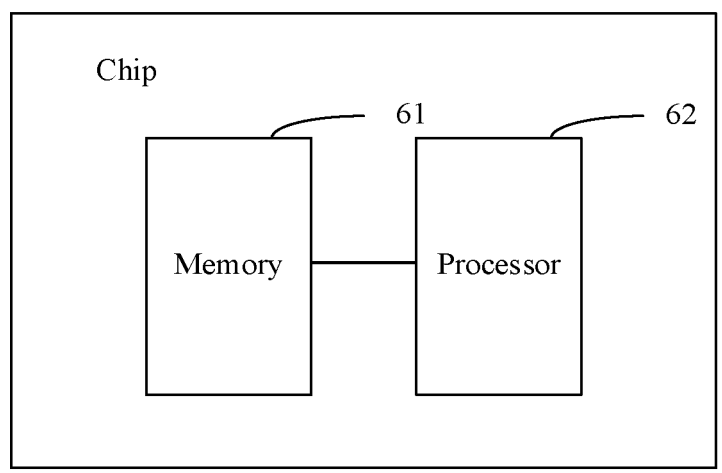
FIG. 16 is a schematic structural diagram of a chip according to this application.

FIG. 16 is a schematic structural diagram of a chip according to this application. As shown in FIG. 16, the chip in this embodiment may be the chip inside the terminal, and the chip in this embodiment may include a memory 61 and a processor 62. The memory 61 is in a communication connection to the processor 62. It should be noted that, the chip may further include another structure or unit that forms the chip, for example, an interface or a slot. This is not limited herein.

During hardware implementation, the receiving module 41, the processing module 42, and the sending module 43 may be built in or independent of the processor 62 of the chip in a hardware form.

Optionally, the memory 61 is configured to store a program instruction, and the processor 62 is configured to invoke the program instruction in the memory 61 to execute the foregoing solutions.

The chip described in this embodiment may be configured to execute the technical solutions executed by the terminal or the chip inside the terminal in the foregoing method embodiments of this application. Implementation principles and technical effects of the chip are similar to those in the method embodiments. For functions of the modules, refer to the corresponding descriptions in the method embodiments, and details are not described herein.

Figure 17:
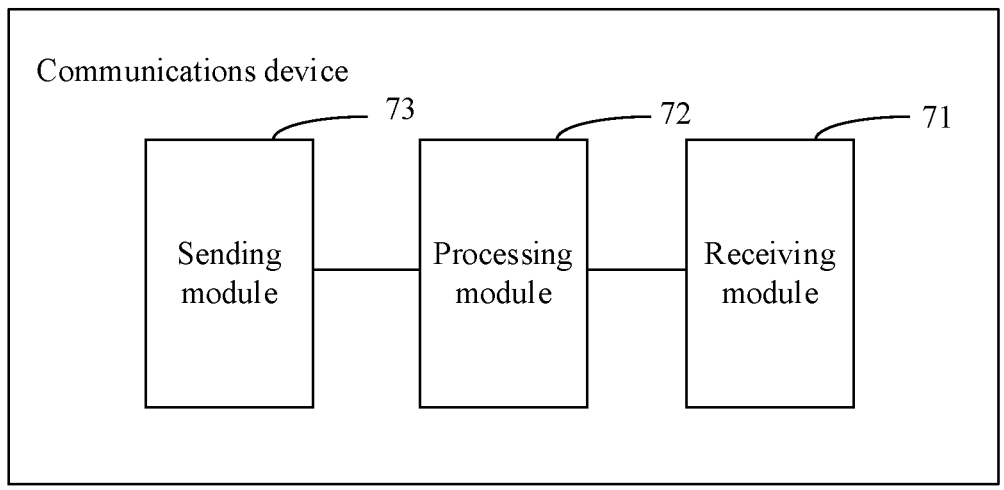
FIG. 17 is a schematic structural diagram of another communications device according to this application.

FIG. 17 is a schematic structural diagram of another communications device according to this application. The communications device serves as a second device. As shown in FIG. 17, the apparatus in this embodiment includes a receiving module 71, a processing module 72, and a sending module 73. The receiving module 71 is configured to receive a handover request message sent by a first device; the processing module 72 is configured to return a handover acknowledgement message to the first device by using the sending module 73, where the handover acknowledgement message carries common system information of the second device; and the processing module 72 sends a first message to the first device by using the sending module 73, where the first message is used to indicate a change occurring in the common system information of the second device.

In an possible implementation, the processing module 72 is configured to send, for the second device by using the sending module 73, the first message to the first device after the common system information of the second device changes, and the first message is used to indicate that the common system information of the second device has changed.

In another possible implementation, the processing module 72 is configured to send, by using the sending module 73, the first message to the first device in a time period before the common system information of the second device changes, and the first message is used to indicate that the common system information of the second device is about to change. In an possible implementation, the first message is specifically used to indicate that the common system information of the second device changes and an application condition of changed common system information.

The apparatus in this embodiment may be configured to execute the technical solution in any one of the method embodiments shown in FIG. 2 to FIG. 6. Implementation principles and technical effects of the apparatus are similar to those in the method embodiments, and details are not described herein again.

Figure 18:
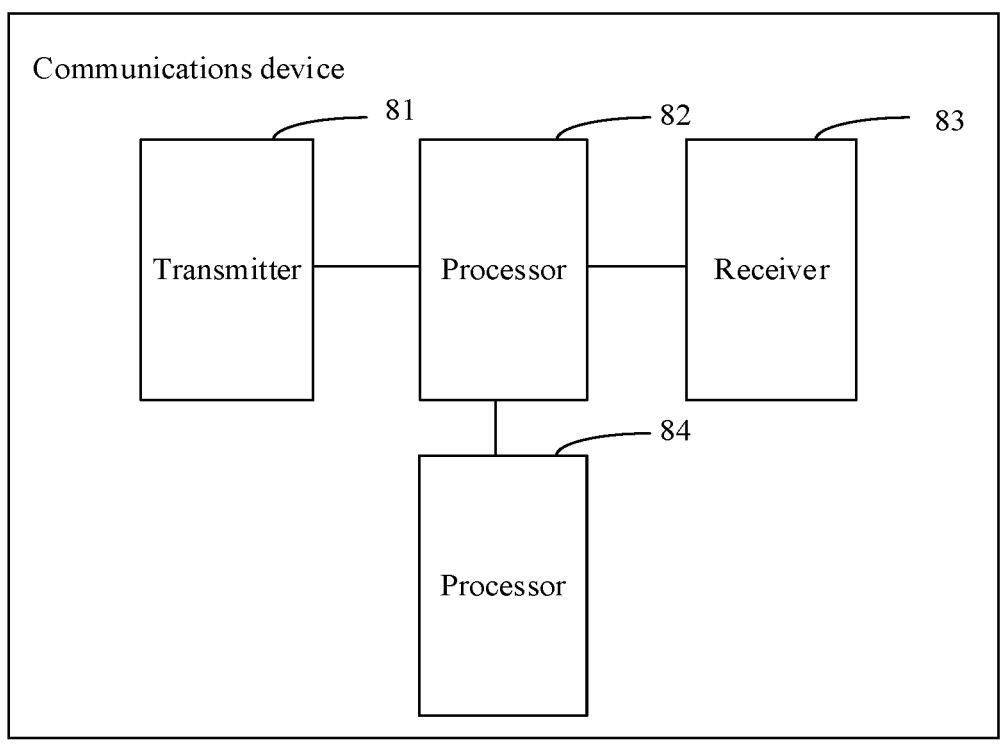
FIG. 18 is a schematic structural diagram of another communications device according to this application.

FIG. 18 is a schematic structural diagram of another communications device according to this application. As shown in FIG. 18, the communications device in this embodiment serves as a second device, and includes a transmitter 81, a processor 82, and a receiver 83.

During hardware implementation, the receiving module 71 may be the receiver 81 in this embodiment, and the receiver 81 may also correspond to a transceiver. The sending module 73 may be the transmitter 83 in this embodiment, and the transmitter 83 may also correspond to a transceiver. The processing module 72 may be built in or independent of the processor 82 of the terminal in a hardware form.

The receiver 81 and the transmitter 83 may include a necessary radio frequency communications device such as a mixer. The processor 82 may include at least one of a central processing unit (Central Processing Unit, CPU), a digital signal processor (digital signal processor, DSP), a micro controller unit (Microcontroller Unit, MCU), an application-specific integrated circuit (Application Specific Integrated Circuit, ASIC), or a field programmable logic gate array (Field-Programmable Gate Array, FPGA).

Optionally, the second device in this embodiment may further include a memory 84. The memory 84 is configured to store a program instruction, and the processor 82 is configured to invoke the program instruction in the memory 84 to execute the foregoing solutions.

The program instruction may be implemented in a form of a software functional unit and can be sold or used as an independent product. The memory 84 may be a computer-readable storage medium in any form. Based on such understanding, all or some of the technical solutions in this application may be represented in a form of a software product, and the software product includes several instructions for instructing a computer device, which may specifically be the processor 82, to perform all or some of the steps of the second device in the embodiments of this application. In addition, the computer-readable storage medium includes various media that can store program code, such as a USB flash drive, a removable hard disk, a read-only memory (Read-Only Memory, ROM), a random access memory (Random Access Memory, RAM), a magnetic disk, or an optical disk.

The second device described in this embodiment may be configured to execute the technical solutions executed by the second device or the chip inside the second device in the foregoing method embodiments. Implementation principles and technical effects of the second device are similar to those in the method embodiments. For functions of the components, refer to the corresponding descriptions in the method embodiments, and details are not described herein again.

Figure 19:
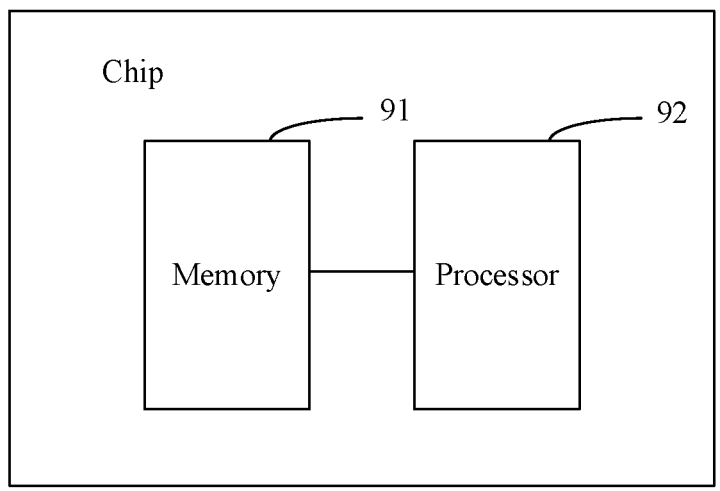
FIG. 19 is a schematic structural diagram of a chip according to this application.

FIG. 19 is a schematic structural diagram of a chip according to this application. As shown in FIG. 19, the chip in this embodiment may be the chip inside the second device, and the chip in this embodiment may include a memory 91 and a processor 92. The memory 91 is in a communication connection to the processor 92. It should be noted that, the chip may further include another structure or unit that forms the chip, for example, an interface or a slot. This is not limited herein.

During hardware implementation, the receiving module 71, the processing module 72, and the sending module 73 may be built in or independent of the processor 92 of the chip in a hardware form.

Optionally, the memory 91 is configured to store a program instruction, and the processor 92 is configured to invoke the program instruction in the memory 91 to execute the foregoing solutions.

The chip described in this embodiment may be configured to execute the technical solutions executed by the second device or the chip inside the second device in the foregoing method embodiments of this application. Implementation principles and technical effects of the chip are similar to those in the method embodiments. For functions of the modules, refer to the corresponding descriptions in the method embodiments, and details are not described herein.

An embodiment of this application further provides another communications device. A structure of the communications device may be the structure of the communications device shown in FIG. 11. The communications device serves as a first device. A processing module is configured to send a handover request message to a second device by using a sending module; a receiving module is configured to receive a handover acknowledgement message returned by the second device, where the handover acknowledgement message carries common system information of the second device and paging configuration information or a system information tag value of the second device; and the processing module sends a handover command to a terminal by using the sending module, where the handover command carries the common system information of the second device and the paging configuration information or the system information tag value of the second device, where the paging configuration information or the system information tag value of the second device is used to: determine whether or when the common system information of the second device changes, and after the common system information of the second device changes, obtain changed common system information of the second device.

The apparatus in this embodiment may be configured to execute the technical solution in any one of the method embodiments shown in FIG. 7 to FIG. 10. Implementation principles and technical effects of the apparatus are similar to those in the method embodiments, and details are not described herein again.

An embodiment of this application further provides another terminal. A structure of the terminal may be the structure of the terminal shown in FIG. 14. A receiving module is configured to receive a handover command sent by a first device, where the handover signaling carries common system information of the second device and paging configuration information or a system information tag value of the second device; and a processing module is configured to obtain changed common system information based on the paging configuration information or the system information tag value of the second device.

Optionally, that the processing module is configured to obtain the changed common system information based on the paging configuration information of the second device may specifically include: periodically reading a paging message of the second device based on the paging configuration information of the second device; and when the paging message carries system information modification indication information, obtaining the changed common system information of the second device in a period following a period in which the paging message is read.

Optionally, that the processing module is configured to obtain the changed common system information based on the system information tag value of the second device may specifically include: periodically reading a system information block SIB1 of the second device; and when a system information tag value of the SIB1 read in an $N^{th}$ period is different from a system information tag value read in a previous period, obtaining common system information of the second device in the $N^{th}$ period, where N is an integer greater than or equal to 1. When N=1, the system tag value read in the previous period is the system information tag value of the second device that is carried in the handover command.

The apparatus in this embodiment may be configured to execute the technical solution in any one of the method embodiments shown in FIG. 7 to FIG. 10. Implementation principles and technical effects of the apparatus are similar to those in the method embodiments, and details are not described herein again.

When at least some functions of the communication methods in the embodiments of this application are implemented by using software, an embodiment of this application further provides a computer-readable storage medium. The computer-readable storage medium is configured to store a computer software instruction used by the foregoing communications device serving as the first device. When the computer software instruction is run on a computer, the computer is enabled to perform various possible communication methods in the foregoing method embodiments. When the computer executable instruction is loaded and executed on the computer, the procedure or functions according to the embodiments of this application are all or partially generated. The computer instruction may be stored in a computer-readable storage medium, or may be transmitted from one computer-readable storage medium to another computer-readable storage medium. The computer software instruction may be transmitted to another website, computer, server, or data center in a wireless (such as cellular communication, infrared, short-distance wireless, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

When at least some functions of the communication methods in the embodiments of this application are implemented by using software, an embodiment of this application further provides a computer-readable storage medium. The computer-readable storage medium is configured to store a computer software instruction used by the foregoing terminal. When the computer software instruction is run on a computer, the computer is enabled to perform various possible communication methods in the foregoing method embodiments. When the computer executable instruction is loaded and executed on the computer, the procedure or functions according to the embodiments of this application are all or partially generated. The computer instruction may be stored in a computer-readable storage medium, or may be transmitted from a computer-readable storage medium to another computer-readable storage medium. The computer software instruction may be transmitted to another website, computer, server, or data center in a wireless manner (for example, cellular communication, infrared, short distance radio, or microwave). The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like.

When at least some functions of the communication methods in the embodiments of this application are implemented by using software, an embodiment of this application further provides a computer-readable storage medium. The computer-readable storage medium is configured to store a computer software instruction used by the foregoing communications device serving as the second device. When the computer software instruction is run on a computer, the computer is enabled to perform various possible communication methods in the foregoing method embodiments. When the computer executable instruction is loaded and executed on the computer, the procedure or functions according to the embodiments of this application are all or partially generated. The computer instruction may be stored in a computer-readable storage medium, or may be transmitted from a computer-readable storage medium to another computer-readable storage medium. The computer software instruction may be transmitted to another website, computer, server, or data center in a wireless manner (for example, cellular communication, infrared, short distance radio, or microwave). The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

In addition, an embodiment of this application further provides a computer program product including an instruction, namely, a software product. When the instruction is run on a computer, the computer is enabled to perform various possible communication methods in the foregoing method embodiments. Implementation principles and technical effects of the computer program product are similar to those in the method embodiments, and details are not described herein again.

What is claimed is:

1. A communication method, comprising:
   sending, by a first device, a handover request message to a second device, and receiving a handover acknowledgement message returned by the second device, wherein the handover acknowledgement message includes common system information of the second device;
   sending, by the first device, a handover command to a terminal, wherein the handover command comprises the common system information of the second device;
   sending, by the first device, a second message to the terminal based on a first message, with the terminal obtaining changed communications system information of the second device based on the second message, wherein the first message is sent by the second device when the common system information of the second device that is in the handover command changes or is about to change, and the first message indicates a change occurring in the common system information of the second device.

2. The method according to claim 1, wherein at least one of the first message and the second message includes change indication information of the second device indicating that the common system information of the second device has changed and the changed common system information of the second device.

3. The method according to claim 1,
   wherein at least one of the first message and the second message includes change indication information of the second device and an application condition of the change indication information, and
   wherein the change indication information indicates that the common system information of the second device changes when the application condition is met.

4. The method according to claim 3,
   wherein the application condition of the changed common system information comprises at least one of a timer expiring, a system time reaching a first system time, and a system frame number reaching a first system frame number, and
wherein the system time is a system time of either the first device or the second device, and the system frame number is a system frame number of either the first device or the second device.

5. The method according to claim 1, wherein the second message is a paging message to the terminal.

6. A communication method according to claim 1,
wherein the handover acknowledgement message further includes at least one of paging configuration information and a system information tag value of the second device,
wherein the handover command further includes the at least one of the paging configuration information and the system information tag value of the second device,
wherein the at least one of the paging configuration information and the system information tag value of the second device determines whether or when the common system information of the second device changes, and
wherein the terminal obtains the changed common system information of the second device after the common system information of the second device changes.

7. The method according to claim 1, wherein the handover command is at least one of an immediate handover command and a conditional handover command.

8. A communication method, comprising:
receiving, by a terminal, a handover command sent by a first device, wherein the handover command comprises common system information of a second device;
receiving, by the terminal, a second message sent by the first device, wherein the second message indicates a change occurring in the common system information of the second device when the common system information of the second device that is in the handover command changes or is about to change;
obtaining, by the terminal, changed common system information of the second device based on the second message; and
performing, by the terminal, the handover command received by using the changed common system information of the second device.

9. The method according to claim 8,
wherein the second message comprises the changed common system information of the second device, and
wherein the obtaining comprises updating, by the terminal, the common system information of the second device based on the changed common system information of the second device.

10. The method according to claim 8,
wherein the second message comprises the changed common system information and an application condition of the changed common system information, and
wherein the obtaining comprises updating, by the terminal after the application condition is met, the common system information of the second device based on the changed common system information of the second device.

11. The method according to claim 8,
wherein the second message comprises first change indication information of the second device, and
wherein the obtaining comprises obtaining, by the terminal, the changed common system information of the second device based on the first change indication information of the second device.

12. The method according to claim 8,
wherein the second message comprises second change indication information of the second device and an application condition of the second change indication information, and
wherein the obtaining comprises obtaining, by the terminal after the application condition is met, the changed common system information of the second device based on the second change indication information of the second device.

13. The method according to claim 12,
wherein second message is a paging message including a cell identity, and
wherein the obtaining, by the terminal after the application condition is met, obtains the changed common system information of the second device corresponding to the cell identity, based on the second change indication information of the second device and the cell identity.

14. The method according to claim 8, wherein the second message is a paging message.

15. The method according to claim 14,
wherein the paging message includes a cell identity, and
wherein the obtaining obtains the changed common system information of the second device corresponding to the cell identity.

16. A communication method according to claim 8,
wherein the handover command further includes at least one of paging configuration information and a system information tag value of the second device, and
wherein the obtaining, by the terminal, obtains the changed common system information based on the at least one of the paging configuration information and the system information tag value of the second device.

17. The method according to claim 16, wherein the obtaining, by the terminal, comprises:
periodically reading, by the terminal, a paging message of the second device based on the paging configuration information of the second device; and
when the paging message includes system information modification indication information, obtaining, by the terminal, the changed common system information of the second device in a period following a period in which the paging message is read.

18. The method according to claim 16, wherein the obtaining, by the terminal, comprises:
periodically reading, by the terminal, a system information block SIB1 of the second device; and
when a system information tag value of the SIB1 read in an $N^{th}$ period is different from a system information tag value read in a previous period, obtaining, by the terminal, common system information of the second device in the $N^{th}$ period,
wherein N is an integer greater than or equal to 1, and the system tag value read in the previous period is the system information tag value of the second device that is included in the handover command.

19. A communication method, comprising:
receiving, by a second device, a handover request message sent by a first device, and returning a handover acknowledgement message to the first device, wherein the handover acknowledgement message includes common system information of the second device; and
sending, by the second device, a first message to the first device when the common system information of the second device that is in the handover acknowledgement message changes or is about to change, wherein the first message indicates a change occurring in the common system information of the second device.

20. The method according to claim 19, wherein the sending, by the second device, of the first message to the first device comprises at least one of:

sending, by the second device, the first message to the first device after the common system information of the second device changes, wherein the first message indicates that the common system information of the second device has changed; and sending, by the second device, the first message to the first device in a time period before the common system information of the second device changes, wherein the first message indicates that the common system information of the second device is about to change.

* * * * *